(12) United States Patent
Miyakoshi et al.

(10) Patent No.: US 10,040,337 B2
(45) Date of Patent: Aug. 7, 2018

(54) VEHICLE AIR CONDITIONER

(71) Applicant: Sanden Holdings Corporation, Isesaki-shi, Gunma (JP)

(72) Inventors: Ryo Miyakoshi, Isesaki (JP); Kenichi Suzuki, Isesaki (JP); Kouhei Yamashita, Isesaki (JP)

(73) Assignee: Sanden Holdings Corporation, Isesaki-shi, Gunma (JP)

( * ) Notice: Subject to any disclaimer, the term of this patent is extended or adjusted under 35 U.S.C. 154(b) by 159 days.

(21) Appl. No.: 14/909,353

(22) PCT Filed: Aug. 5, 2014

(86) PCT No.: PCT/JP2014/070575
§ 371 (c)(1),
(2) Date: Feb. 1, 2016

(87) PCT Pub. No.: WO2015/020030
PCT Pub. Date: Feb. 12, 2015

(65) Prior Publication Data
US 2016/0185186 A1    Jun. 30, 2016

(30) Foreign Application Priority Data
Aug. 7, 2013   (JP) .................................. 2013-164004

(51) Int. Cl.
*F25B 49/00*     (2006.01)
*F25B 1/00*      (2006.01)
(Continued)

(52) U.S. Cl.
CPC ....... *B60H 1/3213* (2013.01); *B60H 1/00385* (2013.01); *B60H 1/00921* (2013.01);
(Continued)

(58) Field of Classification Search
CPC .......... B60H 1/3205; B60H 2001/3238; B60H 2001/3248; B60H 2001/325;
(Continued)

(56) References Cited

U.S. PATENT DOCUMENTS 6,675,597 B2 *   1/2004   Ieda ..................... B60H 1/3207
                                                                  165/204
7,458,226 B2 *   12/2008   Nakamura ........... B60H 1/3205
                                                                   62/222
(Continued)

FOREIGN PATENT DOCUMENTS

CN           102822609 A     12/2012
JP            H09-086149 A     3/1997
(Continued)

OTHER PUBLICATIONS

The State Intellectual Property Office of the People's Republic of China, The First Office Action issued in Application No. CN 201480044308.4, dated Dec. 21, 2016.

*Primary Examiner* — Len Tran
*Assistant Examiner* — Kamran Tavakoldavani
(74) *Attorney, Agent, or Firm* — Baker Botts L.L.P.

(57) ABSTRACT

There is disclosed a vehicle air conditioner in which a refrigerant subcool degree of a radiator to satisfy both a high pressure and a refrigerant flow rate during heating can appropriately be controlled to achieve improvement of a heating capability. The vehicle air conditioner comprises a compressor 2 which compresses a refrigerant, a radiator 4 which lets the refrigerant radiate heat, an outdoor heat exchanger 7 disposed outside the vehicle interior to let the refrigerant radiate or absorb heat, and a controller. The controller executes a heating mode to let the refrigerant discharged from the compressor 2 radiate heat in the radiator 4, decompress the refrigerant by which heat has been radiated and then absorb heat in the outdoor heat exchanger (Continued)

7. The controller 32 has a high pressure priority mode to increase a target radiator subcool degree TGSC of the radiator 4 in a direction in which the high pressure is set to a predetermined high value, and a revolution number priority mode to decrease the target radiator subcool degree of the radiator in a direction in which the revolution number of the compressor 2 is set to a predetermined high value.

13 Claims, 12 Drawing Sheets

(51) Int. Cl.
*B60H 1/32* (2006.01)
*B60H 1/00* (2006.01)
*F25B 13/00* (2006.01)
*F25B 41/04* (2006.01)
(52) U.S. Cl.
CPC ......... *B60H 1/3204* (2013.01); *B60H 1/3208* (2013.01); *F25B 13/00* (2013.01); *F25B 41/04* (2013.01); *B60H 1/008* (2013.01); *B60H 1/00764* (2013.01); *B60H 2001/325* (2013.01); *B60H 2001/3241* (2013.01); *B60H 2001/3245* (2013.01); *B60H 2001/3251* (2013.01); *B60H 2001/3258* (2013.01); *B60H 2001/3261* (2013.01); *B60H 2001/3272* (2013.01); *B60H 2001/3285* (2013.01)

(58) Field of Classification Search
CPC ...... B60H 2001/3251; B60H 2001/326; B60H 2001/3272; F25B 2700/2116; F25B 2700/21162; F25B 2700/21163; F25B 2700/2102; F25B 2700/195; F25B 2700/193; F25B 2600/0253; F25B 2700/025
See application file for complete search history.

(56) References Cited

U.S. PATENT DOCUMENTS 7,610,765 B2 * 11/2009 Kang ..................... F25B 45/00
62/127
2013/0055751 A1 * 3/2013 Inaba .................. B60H 1/2218
62/498

FOREIGN PATENT DOCUMENTS

| JP | 3985384 B2 | 10/2007 |
| JP | 2012-148709 A | 8/2012 |
| WO | 2011/117924 A1 | 9/2011 |
| WO | 2012/118198 A1 | 9/2012 |
| WO | 2013/084738 A1 | 6/2013 |

* cited by examiner

VEHICLE AIR CONDITIONER

CROSS-REFERENCE TO RELATED APPLICATIONS

This application is a U.S. National Stage Patent Application under 37 U.S.C. § 371 of International Patent Application No. PCT/JP2014/070575, filed on Aug. 5, 2014, which claims the benefit of Japanese Patent Application No. JP 2013-164004, filed on Aug. 7, 2013, the disclosures of which are incorporated herein by reference in their entirety.

TECHNICAL FIELD

The present invention relates to a vehicle air conditioner of a heat pump system which conditions air in a vehicle interior, and more particularly, it relates to a vehicle air conditioner applicable to a hybrid car or an electric car.

BACKGROUND ART

Due to actualization of environmental problems in recent years, hybrid cars and electric cars have spread. Furthermore, as an air conditioner which is applicable to such a vehicle, there has been developed an air conditioner which comprises a compressor to compress and discharge a refrigerant, a radiator (a condenser) disposed on a vehicle interior side to let the refrigerant radiate heat, a heat absorber (an evaporator) disposed on the vehicle interior side to let the refrigerant absorb heat, and a refrigerant circuit constituted of an outdoor heat exchanger disposed outside the vehicle interior to let the refrigerant radiate or absorb heat, and which changes and executes respective modes such as a heating mode in which the refrigerant discharged from the compressor radiates heat in the radiator and the refrigerant by which heat has been radiated in this radiator absorbs heat in the outdoor heat exchanger, a dehumidifying mode in which the refrigerant discharged from the compressor radiates heat in the radiator and the refrigerant by which heat has been radiated in the radiator absorbs heat in the heat absorber, and a cooling mode in which the refrigerant discharged from the compressor radiates heat in the outdoor heat exchanger and absorbs heat in the heat absorber (e.g., see Patent Document 1).

Additionally, in Patent Document 1, there is disposed an injection circuit which distributes the refrigerant flowing out from the radiator, decompresses this distributed refrigerant, performs heat exchange between this refrigerant and the refrigerant flowing out from the radiator, and then returns the refrigerant to the middle of compression by the compressor in the heating mode, whereby the refrigerant to be discharged from the compressor is increased, and a heating capability by the radiator improves.

CITATION LIST

Patent Documents

Patent Document 1: Japanese Patent No. 3985384

SUMMARY OF THE INVENTION

Problems to be Solved by the Invention

Here, an upper limit value of controlling (a controlling upper limit value) is set to a revolution number of a compressor. That is, the revolution number of the compressor cannot be set in excess of this upper limit value of controlling. Additionally, a high pressure of a refrigerant circuit also has an upper limit value of controlling to protect the compressor, and hence when a subcool degree of a refrigerant in a radiator is high and the high pressure is in excess of the upper limit value of controlling, control is executed to decrease the revolution number of the compressor, thereby suppressing the high pressure.

However, the high pressure can be maintained at the upper limit value of controlling or less, but at this time, the revolution number of the compressor decreases, and hence a refrigerant flow rate is small, and a heating capability by the radiator runs short, which has caused the problem that a required heating capability cannot be satisfied.

The present invention has been developed to solve such a conventional technical problem, and an object thereof is to provide a vehicle air conditioner in which a refrigerant subcool degree of a radiator to satisfy both a high pressure and a refrigerant flow rate during heating can appropriately be controlled to achieve improvement of a heating capability.

Means for Solving the Problems

A vehicle air conditioner of the present invention comprises a compressor which compresses a refrigerant, a radiator which lets the refrigerant radiate heat to heat air to be supplied into a vehicle interior, an outdoor heat exchanger disposed outside the vehicle interior to let the refrigerant absorb heat, an expansion valve which decompresses the refrigerant flowing into this outdoor heat exchanger, and control means, this control means being configured to let the refrigerant discharged from the compressor radiate heat in the radiator, decompress the refrigerant by which heat has been radiated by the expansion valve and then absorb heat in the outdoor heat exchanger, thereby heating the vehicle interior, the vehicle air conditioner being characterized in that the control means controls a subcool degree of the refrigerant in the radiator by the expansion valve, and controls a revolution number of the compressor on the basis of a high pressure, and has a high pressure priority mode to increase a target radiator subcool degree of the radiator in a direction in which the high pressure is set to a predetermined high value, and a revolution number priority mode to decrease the target radiator subcool degree of the radiator in a direction in which the revolution number of the compressor is set to a predetermined high value.

The vehicle air conditioner of the invention of claim 2 is characterized in that in the above invention, the control means switches and executes the high pressure priority mode and the revolution number priority mode, thereby changing the target radiator subcool degree of the radiator to highly maintain the revolution number of the compressor while maintaining the high pressure at the predetermined high value.

The vehicle air conditioner of the invention of claim 3 is characterized in that in the above invention, the control means executes the high pressure priority mode to increase the target radiator subcool degree of the radiator in the direction in which the high pressure is set to the predetermined high value, shifts to the revolution number priority mode in a case where the high pressure reaches the predetermined high value, and decreases the target radiator subcool degree of the radiator in the direction in which the revolution number of the compressor is set to the predetermined high value.

The vehicle air conditioner of the invention of claim 4 is characterized in that in the above respective inventions, in the high pressure priority mode, the control means increases the target radiator subcool degree of the radiator in a direction in which the high pressure is set to an upper limit value of controlling, and in the revolution number priority mode, the control means decreases the target radiator subcool degree of the radiator in a direction in which the revolution number of the compressor is set to an upper limit value of controlling.

The vehicle air conditioner of the invention of claim 5 is characterized in that in the above invention, in the high pressure priority mode, the control means performs feedback correction of the target radiator subcool degree of the radiator on the basis of a deviation between the upper limit value of controlling of the high pressure and an actual high pressure, and in the revolution number priority mode, the control means performs the feedback correction of the target radiator subcool degree of the radiator on the basis of a deviation between the upper limit value of controlling of the revolution number of the compressor and an actual revolution number.

The vehicle air conditioner of the invention of claim 6 is characterized in that in the above respective inventions, the control means has efficiency priority control and capability priority control, and in the efficiency priority control, the control means determines the target radiator subcool degree of the radiator on the basis of a volume of air to be passed through the radiator, and shifts to the capability priority control in a case where conditions that a heating capability by the radiator runs short are established, and in this capability priority control, the control means executes the high pressure priority mode and the revolution number priority mode and corrects the target radiator subcool degree of the radiator.

The vehicle air conditioner of the invention of claim 7 is characterized in that the above invention comprises an injection circuit which distributes a part of the refrigerant flowing out from the radiator to return the part of the refrigerant to the compressor, and the control means changes conditions to shift to the capability priority control in a case where the injection circuit returns the part of the refrigerant flowing out from the radiator to the compressor and a case where the injection circuit does not return the part of the refrigerant to the compressor.

Advantageous Effect of the Invention

According to the present invention, control means has a high pressure priority mode to increase a target radiator subcool degree of a radiator in a direction in which a high pressure is set to a predetermined high value, and a revolution number priority mode to decrease the target radiator subcool degree of the radiator in a direction in which a revolution number of a compressor is set to a predetermined high value. Therefore, as in the invention of claim 2, the control means switches and executes the high pressure priority mode and the revolution number priority mode, thereby changing the target radiator subcool degree of the radiator to highly maintain the revolution number of the compressor while maintaining the high pressure at the predetermined high value, so that a refrigerant flow rate is also acquired while maintaining the high pressure during heating and it is possible to improve a heating capability.

In this case, for example, as in the invention of claim 3, the control means executes the high pressure priority mode to increase the target radiator subcool degree of the radiator in the direction in which the high pressure is set to the predetermined high value, shifts to the revolution number priority mode in a case where the high pressure reaches the predetermined high value, and decreases the target radiator subcool degree of the radiator in the direction in which the revolution number of the compressor is set to the predetermined high value, so that it is possible to appropriately control a refrigerant subcool degree of the radiator which satisfies both the high pressure and the refrigerant flow rate.

Particularly, as in the invention of claim 4, in the high pressure priority mode, the control means increases the target radiator subcool degree of the radiator in a direction in which the high pressure is set to an upper limit value of controlling, and in the revolution number priority mode, the control means decreases the target radiator subcool degree of the radiator in a direction in which the revolution number of the compressor is set to an upper limit value of controlling. Consequently, the revolution number of the compressor is increased to also maintain the refrigerant flow rate while appropriately controlling the refrigerant subcool degree of the radiator to suppress the high pressure to the upper limit value of controlling or less, and hence the heating capability can improve.

In this case, as in the invention of claim 5, in the high pressure priority mode, the control means performs feedback correction of the target radiator subcool degree of the radiator on the basis of a deviation between the upper limit value of controlling of the high pressure and an actual high pressure, and in the revolution number priority mode, the control means performs the feedback correction of the target radiator subcool degree of the radiator on the basis of a deviation between the upper limit value of controlling of the revolution number of the compressor and an actual revolution number, so that it is possible to always stably realize the correction of the refrigerant subcool degree of the radiator.

Additionally, as in the invention of claim 6, the control means has efficiency priority control and capability priority control, and in the efficiency priority control, the control means determines the target radiator subcool degree of the radiator on the basis of a volume of air to be passed through the radiator, and shifts to the capability priority control in a case where conditions that a heating capability by the radiator runs short are established, and in this capability priority control, the control means executes the high pressure priority mode and the revolution number priority mode and corrects the target radiator subcool degree of the radiator. Consequently, the control means always executes the efficiency priority control, and can execute the capability priority control to execute the high pressure priority mode and the revolution number priority mode only in a case where the heating capability of the radiator runs short.

In consequence, the improvement of the heating capability can be achieved while minimizing deterioration of an operation efficiency, and hence the present invention is remarkably suitable in a vehicle such as an electric car or a hybrid car which drives the compressor with a power charged in a battery.

Furthermore, as in the invention of claim 7, when the vehicle air conditioner comprises an injection circuit which distributes a part of the refrigerant flowing out from the radiator to return the part of the refrigerant to the compressor, the control means changes conditions to shift to the capability priority control in a case where the injection circuit returns the part of the refrigerant flowing out from the radiator to the compressor and a case where the injection circuit does not return the part of the refrigerant to the compressor, so that it is possible to appropriately correct the refrigerant subcool degree of the radiator in consideration of the improvement of the heating capability due to increase of an amount of the refrigerant to be discharged from the compressor by injection.

MODE FOR CARRYING OUT THE INVENTION

Hereinafter, embodiments of the present invention will be described in detail with reference to the drawings.

Figure 1:
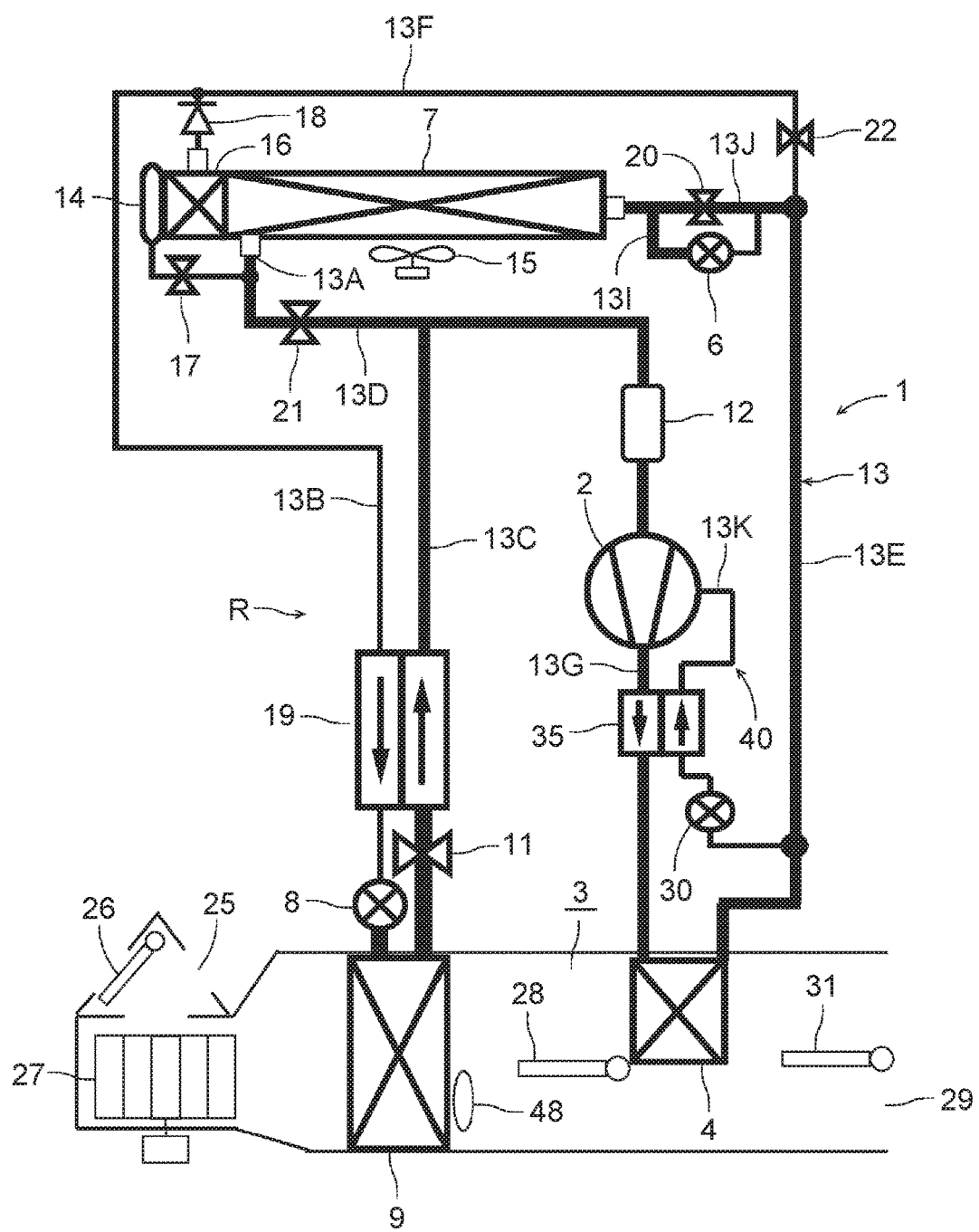
FIG. 1 is a constitutional view of a vehicle air conditioner of one embodiment to which the present invention is applied.

FIG. 1 shows a constitutional view of a vehicle air conditioner 1 of one embodiment of the present invention. In this case, a vehicle of the embodiment to which the present invention is applied is an electric car (EV) which does not have an engine (an internal combustion engine), and runs by driving an electric motor for running by a power charged in a battery (which is not shown), and the vehicle air conditioner 1 of the present invention is also driven by the power of the battery. That is, in the electric car in which heating cannot be performed by waste heat of the engine, the vehicle air conditioner 1 of the embodiment performs the heating by a heat pump operation in which a refrigerant circuit is used, and further selectively executes respective operation modes of dehumidifying and heating, cooling and dehumidifying, cooling, and the like.

It is to be noted that the vehicle is not limited to the electric car, and the present invention is also effective for a so-called hybrid car in which the engine is used together with the electric motor for the running, and is, needless to say, further applicable also to a usual car which runs by the engine.

The vehicle air conditioner 1 of the embodiment performs air conditioning (heating, cooling, dehumidifying, and ventilation) in the electric car, and there are successively connected, by a refrigerant pipe 13, an electric compressor 2 which compresses a refrigerant, a radiator 4 disposed in an air flow passage 3 of an HVAC unit 10 in which air in the vehicle interior is passed and circulated, to let the high-temperature high-pressure refrigerant discharged from the compressor 2 radiate heat in the vehicle interior, an outdoor expansion valve 6 constituted of an electric valve which decompresses and expands the refrigerant during the heating, an outdoor heat exchanger 7 which performs heat exchange between the refrigerant and outdoor air to function as the radiator during the cooling and function as an evaporator during the heating, an indoor expansion valve 8 constituted of an electric valve which decompresses and expands the refrigerant, a heat absorber 9 disposed in the air flow passage 3 to let the refrigerant absorb heat from interior and exterior of the vehicle during the cooling and during the dehumidifying, an evaporation capability control valve 11 which regulates an evaporation capability in the heat absorber 9, an accumulator 12 and the like, so that a refrigerant circuit R is constituted. It is to be noted that in the outdoor heat exchanger 7, an outdoor blower 15 is disposed which performs the heat exchange between the outdoor air and the refrigerant.

In addition, the outdoor heat exchanger 7 has a receiver drier portion 14 and a subcooling portion 16 successively on a refrigerant downstream side, a refrigerant pipe 13A extended out from the outdoor heat exchanger 7 is connected to the receiver drier portion 14 via a solenoid valve (an opening/closing valve) 17 opened during the cooling, and an outlet of the subcooling portion 16 is connected to the indoor expansion valve 8 via a check valve 18. It is to be noted that the receiver drier portion 14 and the subcooling portion 16 structurally constitute a part of the outdoor heat exchanger 7, and an indoor expansion valve 8 side of the check valve 18 is a forward direction.

In addition, a refrigerant pipe 13B between the check valve 18 and the indoor expansion valve 8 is disposed in a heat exchange relation with a refrigerant pipe 13C extended out from the evaporation capability control valve 11 positioned on an outlet side of the heat absorber 9, and both the pipes constitute an internal heat exchanger 19. In consequence, the refrigerant flowing through the refrigerant pipe 13B into the indoor expansion valve 8 is cooled (subcooled) by the low-temperature refrigerant flowing out from the heat absorber 9 through the evaporation capability control valve 11.

In addition, the refrigerant pipe 13A extended out from the outdoor heat exchanger 7 is branched, and this branched refrigerant pipe 13D communicates to be connected to the refrigerant pipe 13C on the downstream side of the internal heat exchanger 19 via a solenoid valve (an opening/closing valve) 21 to be opened during the heating. Furthermore, a refrigerant pipe 13E on an outlet side of the radiator 4 is branched before the outdoor expansion valve 6, and this branched refrigerant pipe 13F communicates to be connected to the refrigerant pipe 13B on the downstream side of the check valve 18 via a solenoid valve (an opening/closing valve) 22 to be opened during the dehumidifying.

In addition, a bypass pipe 13J is connected in parallel with the outdoor expansion valve 6, and in the bypass pipe 13J, there is disposed a solenoid valve (an opening/closing valve) 20 which is opened in a cooling mode and bypasses the outdoor expansion valve 6 to pass the refrigerant.

Additionally, the refrigerant pipe 13E immediately after the pipe is extended out from the radiator 4 (before the pipe is branched into refrigerant pipes 13F and 13I) is branched, and this branched refrigerant pipe 13K communicates to be connected to the middle of compression by the compressor 2 via an injection expansion valve 30 constituted of an electric valve for injection control. Further, the refrigerant pipe 13K between an outlet side of the injection expansion valve 30 and the compressor 2 is disposed in a heat exchange relation with a refrigerant pipe 13G positioned on a discharge side of the compressor 2, and both the pipes constitute a discharge side heat exchanger 35.

The refrigerant pipe 13K, the injection expansion valve 30 and the discharge side heat exchanger 35 constitute an injection circuit 40. The injection circuit 40 is a circuit which distributes a part of the refrigerant flowing out from the radiator 4 to return the part of the refrigerant to the middle of the compression by the compressor 2 (gas injection). Additionally, the injection expansion valve 30 decompresses the refrigerant flowing into the refrigerant pipe 13K, and then the refrigerant flows into the discharge side heat exchanger 35. The refrigerant flowing into the discharge side heat exchanger 35 is discharged from the compressor 2 to the refrigerant pipe 13G, performs heat exchange with the refrigerant before flowing into the radiator 4, and absorbs heat from the refrigerant flowing through the refrigerant pipe 13G to evaporate. In the discharge side heat exchanger 35, the refrigerant distributed to the refrigerant pipe 13K evaporates, whereby the gas injection into the compressor 2 is performed.

Additionally, in the air flow passage 3 on an air upstream side of the heat absorber 9, respective suction ports such as an outdoor air suction port and an indoor air suction port are formed (represented by a suction port 25 in FIG. 1), and in the suction port 25, a suction changing damper 26 is disposed to change the air to be introduced into the air flow passage 3 to indoor air which is air in the vehicle interior (an indoor air circulating mode) and outdoor air which is air outside the vehicle interior (an outdoor air introducing mode). Further, on an air downstream side of the suction changing damper 26, an indoor blower (a blower fan) 27 is disposed to supply the introduced indoor air or outdoor air to the air flow passage 3.

Additionally, in the air flow passage 3 on the air upstream side of the radiator 4, an air mix damper 28 is disposed to regulate a degree of flow of the indoor air or the outdoor air through the radiator 4. Further, in the air flow passage 3 on an air downstream side of the radiator 4, each outlet of foot, vent or defroster (represented by an outlet 29 in FIG. 1) is formed, and in the outlet 29, an outlet changing damper 31 is disposed to perform changing control of blowing of the air from each outlet mentioned above.

Figure 2:
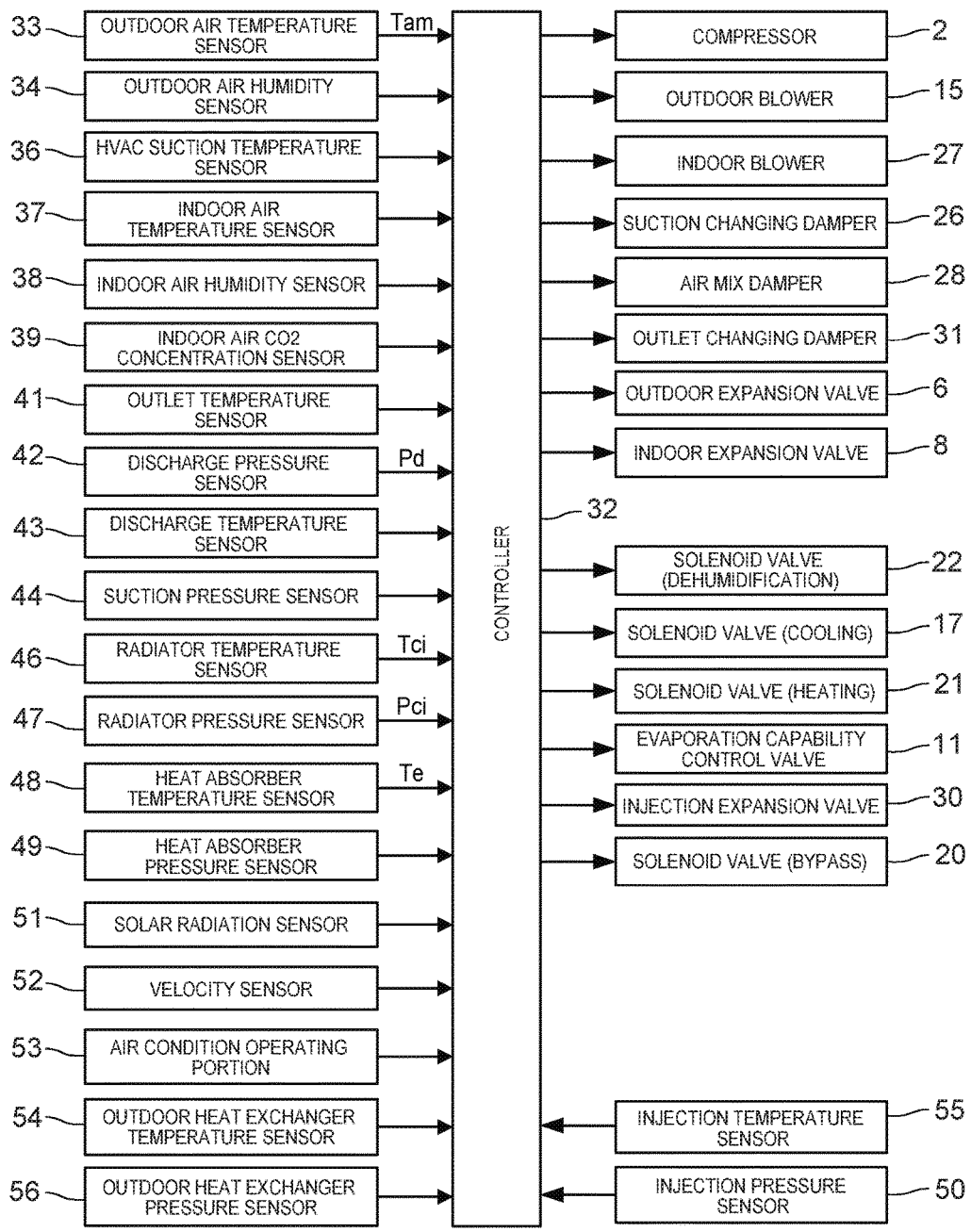
FIG. 2 is a block diagram of an electric circuit of a controller of the vehicle air conditioner of FIG. 1.

Next, in FIG. 2, 32 is a controller (ECU) as control means constituted of a microcomputer, and an input of the controller 32 is connected to respective outputs of an outdoor air temperature sensor 33 which detects an outdoor air temperature of the vehicle, an outdoor air humidity sensor 34 which detects an outdoor air humidity, an HVAC suction temperature sensor 36 which detects a temperature of the air to be sucked from the suction port 25 to the air flow passage 3, an indoor air temperature sensor 37 which detects a temperature of the air in the vehicle interior (the indoor air), an indoor air humidity sensor 38 which detects a humidity of the air in the vehicle interior, an indoor $CO_2$ concentration sensor 39 which detects a carbon dioxide concentration in the vehicle interior, an outlet temperature sensor 41 which detects a temperature of the air blown out from the outlet 29 into the vehicle interior, a discharge pressure sensor 42 which detects a pressure of the refrigerant discharged from the compressor 2, a discharge temperature sensor 43 which detects a temperature of the refrigerant discharged from the compressor 2, a suction pressure sensor 44 which detects a suction refrigerant pressure of the compressor 2, a radiator temperature sensor 46 which detects a temperature of the radiator 4 (the temperature of the air which has just flowed out from the radiator 4 or the temperature of the radiator 4 itself or the temperature of the air which has just been heated in the radiator 4), a radiator pressure sensor 47 which detects a refrigerant pressure of the radiator 4 (the pressure in the radiator 4 or the pressure of the refrigerant which has just flowed out from the radiator 4), a heat absorber temperature sensor 48 which detects a temperature of the heat absorber 9 (the temperature of the air which has just flowed out from the heat absorber 9 or the temperature of the heat absorber 9 itself or the temperature of the air which has just been cooled in the heat absorber 9), a heat absorber pressure sensor 49 which detects a refrigerant pressure of the heat absorber 9 (the pressure in the heat absorber 9 or the pressure of the refrigerant which has just flowed out from the heat absorber 9), a solar radiation sensor 51 of, e.g., a photo sensor system to detect a solar radiation amount into the vehicle, a velocity sensor 52 to detect a moving speed of the vehicle (a velocity), an air conditioning operating portion 53 to set the changing of the set temperature or the operation mode, an outdoor heat exchanger temperature sensor 54 which detects a temperature of the outdoor heat exchanger 7 (the temperature of the refrigerant which has just flowed out from the outdoor heat exchanger 7 or the temperature of the outdoor heat exchanger 7 itself), and an outdoor heat exchanger pressure sensor 56 which detects the refrigerant pressure of the outdoor heat exchanger 7 (the pressure of the refrigerant in the outdoor heat exchanger 7 or the refrigerant which has just flowed out from the outdoor heat exchanger 7).

Additionally, the input of the controller 32 is further connected to respective outputs of an injection pressure sensor 50 which detects a pressure of an injection refrigerant flowing into the refrigerant pipe 13K of the injection circuit 40 and flowing through the discharge side heat exchanger 35 to return to the middle of the compression by the compressor 2, and an injection temperature sensor 55 which detects a temperature of the injection refrigerant.

On the other hand, an output of the controller 32 is connected to the compressor 2, the outdoor blower 15, the indoor blower (the blower fan) 27, the suction changing damper 26, the air mix damper 28, the outlet changing damper 31, the outdoor expansion valve 6, the indoor expansion valve 8, the respective solenoid valves 22, 17, 21 and 20, the injection expansion valve 30, and the evaporation capability control valve 11. Further, the controller 32 controls these components on the basis of the outputs of the respective sensors and the setting input by the air conditioning operating portion 53.

Next, an operation of the vehicle air conditioner 1 of the embodiment having the abovementioned constitution will be described. The controller 32 changes and executes respective roughly divided operation modes such as a heating mode, a dehumidifying and heating mode, an internal cycle mode, a dehumidifying and cooling mode, and a cooling mode. First, the flow of the refrigerant in each operation mode will be described.

(1) Flow of Refrigerant of Heating Mode

When the heating mode is selected by the controller 32 or a manual operation to the air conditioning operating portion 53, the controller 32 opens the solenoid valve 21 and closes the solenoid valve 17, the solenoid valve 22 and the solenoid valve 20. Furthermore, the compressor 2 and the respective blowers 15 and 27 are operated, and the air mix damper 28 has a state where the air blown out from the indoor blower 27 is passed through the radiator 4. In consequence, a high-temperature high-pressure gas refrigerant discharged from the compressor 2 flows through the discharge side heat exchanger 35 and then flows into the radiator 4. The air in the air flow passage 3 is passed through the radiator 4, and hence the air in the air flow passage 3 is heated by the high-temperature refrigerant in the radiator 4, whereas the refrigerant in the radiator 4 has the heat taken by the air and is cooled to condense and liquefy.

The refrigerant liquefied in the radiator 4 flows out from the radiator 4, and then a part of the refrigerant is distributed to the refrigerant pipe 13K of the injection circuit 40, and mainly flows through the refrigerant pipe 13E to reach the outdoor expansion valve 6. It is to be noted that a function and an operation of the injection circuit 40 will be described later. The refrigerant flowing into the outdoor expansion valve 6 is decompressed therein and then flows into the outdoor heat exchanger 7. The refrigerant flowing into the outdoor heat exchanger 7 evaporates, and the heat is pumped up from the outdoor air passed by running or the outdoor blower 15 (heat pump). Further, the low-temperature refrigerant flowing out from the outdoor heat exchanger 7 flows through the refrigerant pipe 13D and the solenoid valve 21 to flow from the refrigerant pipe 13C into the accumulator 12 in which gas liquid separation is performed, and then the gas refrigerant is sucked into the compressor 2, thereby repeating this circulation. The air heated in the radiator 4 is blown out from the outlet 29, and hence the heating in the vehicle interior is performed.

As described later in the embodiment, the controller 32 controls a revolution number of the compressor 2 on the basis of a high pressure of the refrigerant circuit R which is detected by the radiator pressure sensor 47 (or the discharge pressure sensor 42), also controls a valve position of the outdoor expansion valve 6 on the basis of a volume of air to be passed through the radiator 4 and an after-mentioned target outlet temperature, and controls a subcool degree of the refrigerant in the outlet of the radiator 4. It is to be noted that the valve position of the outdoor expansion valve 6 may be controlled on the basis of a temperature of the radiator 4 or an outdoor air temperature in place of or in addition to the above conditions.

(2) Flow of Refrigerant of Dehumidifying and Heating Mode

Next, in the dehumidifying and heating mode, the controller 32 opens the solenoid valve 22 in the above state of the heating mode. In consequence, a part of the condensed refrigerant flowing through the radiator 4 and the refrigerant pipe 13E is distributed, and flows through the solenoid valve 22 to flow from the refrigerant pipes 13F and 13B through the internal heat exchanger 19, thereby reaching the indoor expansion valve 8. The refrigerant is decompressed in the indoor expansion valve 8 and then flows into the heat absorber 9 to evaporate. Water in the air blown out from the indoor blower 27 coagulates to adhere to the heat absorber 9 by a heat absorbing operation at this time, and hence the air is cooled and dehumidified.

The refrigerant evaporated in the heat absorber 9 flows through the evaporation capability control valve 11 and the internal heat exchanger 19 to join the refrigerant from the refrigerant pipe 13D in the refrigerant pipe 13C, and then flows through the accumulator 12 to be sucked into the compressor 2, thereby repeating this circulation. The air dehumidified in the heat absorber 9 is reheated in a process of passing the radiator 4, and hence the dehumidifying and heating in the vehicle interior are performed.

The controller 32 controls the revolution number of the compressor 2 on the basis of the high pressure of the refrigerant circuit R which is detected by the discharge pressure sensor 42 or the radiator pressure sensor 47, and also controls the valve position of the outdoor expansion valve 6 on the basis of the temperature of the heat absorber 9 which is detected by the heat absorber temperature sensor 48. It is to be noted that in this dehumidifying and heating mode, the gas injection by the injection circuit 40 is not performed, and hence the injection expansion valve 30 is shut off (a shut off position).

(3) Flow of Refrigerant of Internal Cycle Mode

Next, in the internal cycle mode, the controller 32 shuts off the outdoor expansion valve 6 in the above state of the dehumidifying and heating mode (a shut off position), and also closes the solenoid valve 21. The outdoor expansion valve 6 and the solenoid valve 21 are closed, whereby inflow of the refrigerant into the outdoor heat exchanger 7 and outflow of the refrigerant from the outdoor heat exchanger 7 are obstructed, and hence all the condensed refrigerant flowing through the radiator 4 and the refrigerant pipe 13E flows through the solenoid valve 22 to the refrigerant pipe 13F. Further, the refrigerant flowing through the refrigerant pipe 13F flows from the refrigerant pipe 13B through the internal heat exchanger 19 to reach the indoor expansion valve 8. The refrigerant is decompressed in the indoor expansion valve 8 and then flows into the heat absorber 9 to evaporate. The water in the air blown out from the indoor blower 27 coagulates to adhere to the heat absorber 9 by the heat absorbing operation at this time, and hence the air is cooled and dehumidified.

The refrigerant evaporated in the heat absorber 9 flows through the evaporation capability control valve 11, the internal heat exchanger 19, the refrigerant pipe 13C and the accumulator 12 to be sucked into the compressor 2, thereby repeating this circulation. The air dehumidified in the heat absorber 9 is reheated in the process of passing the radiator 4, and hence the dehumidifying and heating in the vehicle interior are performed. However, in this internal cycle mode, the refrigerant is circulated between the radiator 4 (heat radiation) and the heat absorber 9 (heat absorption) which are present in the air flow passage 3 on an indoor side, and hence the heat is not pumped up from the outdoor air, but a heating capability for consumed power of the compressor 2 is exerted. The whole amount of the refrigerant flows through the heat absorber 9 which exerts a dehumidifying operation, and hence as compared with the above dehumidifying and heating mode, a dehumidifying capability is high, but the heating capability lowers.

The controller 32 controls the revolution number of the compressor 2 on the basis of the temperature of the heat absorber 9 or the abovementioned high pressure of the refrigerant circuit R. At this time, the controller 32 selects a smaller compressor target number of revolution from compressor target numbers of revolution obtained by calculations from the temperature of the heat absorber 9 or the high pressure, to control the compressor 2. It is to be noted that also in this internal cycle mode, the gas injection by the injection circuit 40 is not performed, and hence the injection expansion valve 30 is shut off (the shut off position).

(4) Flow of Refrigerant of Dehumidifying and Cooling Mode

Next, in the dehumidifying and cooling mode, the controller 32 opens the solenoid valve 17 and closes the solenoid valve 21, the solenoid valve 22 and the solenoid valve 20. Furthermore, the compressor 2 and the respective blowers 15 and 27 are operated, and the air mix damper 28 has the state where the air blown out from the indoor blower 27 is passed through the radiator 4. In consequence, the high-temperature high-pressure gas refrigerant discharged from the compressor 2 flows into the radiator 4 through the discharge side heat exchanger 35. Through the radiator 4, the air in the air flow passage 3 is passed, and hence the air in the air flow passage 3 is heated by the high-temperature refrigerant in the radiator 4, whereas the refrigerant in the radiator 4 has the heat taken by the air and is cooled to condense and liquefy.

The refrigerant flowing out from the radiator 4 flows through the refrigerant pipe 13E to reach the outdoor expansion valve 6, and flows through the outdoor expansion valve 6 controlled so that the valve tends to be open, to flow into the outdoor heat exchanger 7. The refrigerant flowing into the outdoor heat exchanger 7 is cooled by the running therein or the outdoor air passed by the outdoor blower 15, to condense. The refrigerant flowing out from the outdoor heat exchanger 7 flows from the refrigerant pipe 13A through the solenoid valve 17 to successively flow into the receiver drier portion 14 and the subcooling portion 16. Here, the refrigerant is subcooled.

The refrigerant flowing out from the subcooling portion 16 of the outdoor heat exchanger 7 flows through the check valve 18 to enter the refrigerant pipe 13B, and flows through the internal heat exchanger 19 to reach the indoor expansion valve 8. The refrigerant is decompressed in the indoor expansion valve 8 and then flows into the heat absorber 9 to evaporate. The water in the air blown out from the indoor blower 27 coagulates to adhere to the heat absorber 9 by the heat absorbing operation at this time, and hence the air is cooled and dehumidified.

The refrigerant evaporated in the heat absorber 9 flows through the evaporation capability control valve 11, the internal heat exchanger 19 and the refrigerant pipe 13C to reach the accumulator 12, and flows therethrough to be sucked into the compressor 2, thereby repeating this circulation. The air cooled and dehumidified in the heat absorber 9 is reheated in the process of passing the radiator (a radiation capability is lower than that during the heating), and hence the dehumidifying and cooling in the vehicle interior are performed.

The controller 32 controls the revolution number of the compressor 2 on the basis of the temperature of the heat absorber 9 which is detected by the heat absorber temperature sensor 48, also controls the valve position of the outdoor expansion valve 6 on the basis of the abovementioned high pressure of the refrigerant circuit R, and controls a refrigerant pressure (a radiator pressure Pci) of the radiator 4. It is to be noted that also in this dehumidifying and cooling mode, the gas injection by the injection circuit 40 is not performed, and hence the injection expansion valve 30 is shut off (the shut off position).

(5) Flow of Refrigerant of Cooling Mode

Next, in the cooling mode, the controller 32 opens the solenoid valve 20 in the above state of the dehumidifying and cooling mode (in this case, the outdoor expansion valve 6 may have any valve position including a fully open position (the valve position is set to an upper limit of controlling), and the air mix damper 28 has a state where the air is not passed through the radiator 4. In consequence, the high-temperature high-pressure gas refrigerant discharged from the compressor 2 flows into the radiator 4 through the discharge side heat exchanger 35. The air in the air flow passage 3 is not passed through the radiator 4, the refrigerant therefore only passes here, and the refrigerant flowing out from the radiator 4 flows through the refrigerant pipe 13E to reach the solenoid valve 20 and the outdoor expansion valve 6.

At this time, the solenoid valve 20 is opened and hence the refrigerant bypasses the outdoor expansion valve 6 to pass the bypass pipe 13J, and flows into the outdoor heat exchanger 7 as it is, in which the refrigerant is cooled by the running therein or the outdoor air passed through the outdoor blower 15, to condensate and liquefy. The refrigerant flowing out from the outdoor heat exchanger 7 flows from the refrigerant pipe 13A through the solenoid valve 17 to successively flow into the receiver drier portion 14 and the subcooling portion 16. Here, the refrigerant is subcooled.

The refrigerant flowing out from the subcooling portion 16 of the outdoor heat exchanger 7 flows through the check valve 18 to enter the refrigerant pipe 13B, and flows through the internal heat exchanger 19 to reach the indoor expansion valve 8. The refrigerant is decompressed in the indoor expansion valve 8 and then flows into the heat absorber 9 to evaporate. The water in the air blown out from the indoor blower 27 coagulates to adhere to the heat absorber 9 by the heat absorbing operation at this time, so that the air is cooled.

The refrigerant evaporated in the heat absorber 9 flows through the evaporation capability control valve 11, the internal heat exchanger 19 and the refrigerant pipe 13C to reach the accumulator 12, and flows therethrough to be sucked into the compressor 2, thereby repeating this circulation. The air cooled and dehumidified in the heat absorber 9 does not pass the radiator 4 but is blown out from the outlet 29 into the vehicle interior, and hence cooling in the vehicle interior is performed. In this cooling mode, the controller 32 controls the revolution number of the compressor 2 on the basis of the temperature of the heat absorber 9 which is detected by the heat absorber temperature sensor 48. It is to be noted that also in this cooling mode, the gas injection by the injection circuit 40 is not performed, and hence the injection expansion valve 30 is shut off (the shut off position).

(6) Changing Control of Operation Modes

At startup, the controller 32 selects the operation mode on the basis of an outdoor air temperature Tam detected by the outdoor air temperature sensor 33 and a target outlet temperature TAO. Additionally, after the startup, the controller selects and changes the above respective operation modes in accordance with a change of an environment or setting conditions such as the outdoor air temperature Tam, the target outlet temperature TAO or the like. In this case, the controller 32 basically shifts from the heating mode to the dehumidifying and heating mode or from the dehumidifying and heating mode to the heating mode, shifts from the dehumidifying and heating mode to the dehumidifying and cooling mode or from the dehumidifying and cooling mode to the dehumidifying and heating mode, and shifts from the dehumidifying and cooling mode to the cooling mode or from the cooling mode to the dehumidifying and cooling mode, but when the controller shifts from the dehumidifying and heating mode to the dehumidifying and cooling mode and shifts from the dehumidifying and cooling mode to the dehumidifying and heating mode, the controller shifts via the internal cycle mode. Additionally, the controller might shift from the cooling mode to the internal cycle mode or from the internal cycle mode to the cooling mode.

(7) Gas Injection in Heating Mode

Figure 3:
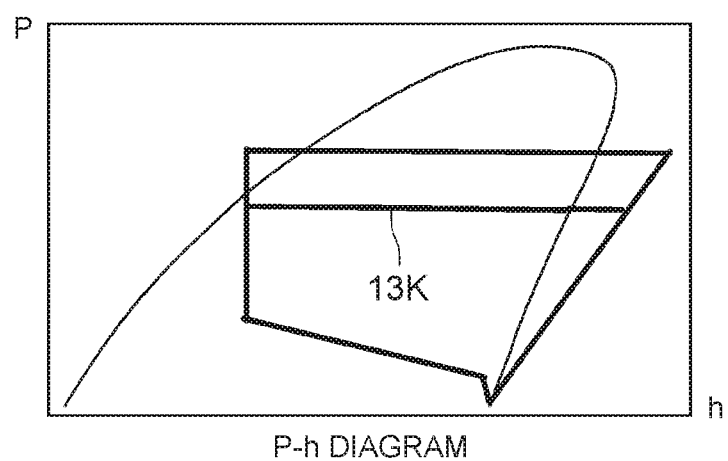
FIG. 3 is a P-h diagram of the vehicle air conditioner of FIG. 1 during injection.

Next, the gas injection in the above heating mode will be described. FIG. 3 shows a P-h diagram of the vehicle air conditioner 1 of the present invention in the heating mode. The refrigerant flowing out from the radiator 4 to enter the refrigerant pipe 13E and then distributed to flow into the refrigerant pipe 13K of the injection circuit 40 is decompressed by the injection expansion valve 30, enters the discharge side heat exchanger 35 to perform therein the heat exchange with the discharged refrigerant of the compressor 2 (the refrigerant discharged from the compressor 2 before flowing into the radiator 4), and then absorbs heat to evaporate. Afterward, the evaporated gas refrigerant returns to the middle of the compression by the compressor 2, is further compressed together with the refrigerant sucked from the accumulator 12 to be compressed, and then discharged from the compressor 2 to the refrigerant pipe 13G again.

In FIG. 3, a line denoted with 13K indicates the refrigerant returned to the compressor 2 by the injection circuit 40. The refrigerant is returned from the injection circuit 40 to the middle of the compression by the compressor 2, the amount of the refrigerant to be discharged from the compressor 2 increases, and hence the heating capability in the radiator 4 improves. However, when a liquid refrigerant returns to the compressor 2, liquid compression is caused, and hence the refrigerant to be returned from the injection circuit 40 to the compressor 2 has to be a gas.

Therefore, the controller 32 monitors a superheat degree of the refrigerant flowing toward the middle of the compression by the compressor 2, from the pressure and temperature of the refrigerant after the discharge side heat exchanger 35 which are detected by the injection pressure sensor 50 and the injection temperature sensor 55, respectively, and the controller controls the valve position of the injection expansion valve 30 so that a predetermined superheat degree is attached in the heat exchange with the discharged refrigerant. However, in the embodiment, the heat exchange between the remarkably high-temperature refrigerant discharged from the compressor 2 before flowing into the radiator 4 and the refrigerant flowing through the injection circuit 40 is performed in the discharge side heat exchanger 35, and hence a large heat exchange amount can be obtained. Therefore, even when the valve position of the injection expansion valve 30 is enlarged to increase an injection amount, the refrigerant can sufficiently evaporate in the discharge side heat exchanger 35, and a necessary superheat degree can be obtained.

In consequence, the gas injection amount to the compressor 2 can sufficiently be acquired and the amount of the refrigerant to be discharged from the compressor 2 can be increased to improve the heating capability, as compared with a case where the heat exchange between the refrigerant after the radiator and the injection refrigerant is performed as in a conventional technology.

Next, there will be described control of a target radiator subcool degree which is a target value of a subcool degree SC of the refrigerant in the compressor 2, the injection circuit 40 and the radiator 4 in the above heating mode, with reference to FIG. 4 to FIG. 10.

(8) Control of Compressor in Heating Mode

Figure 4:
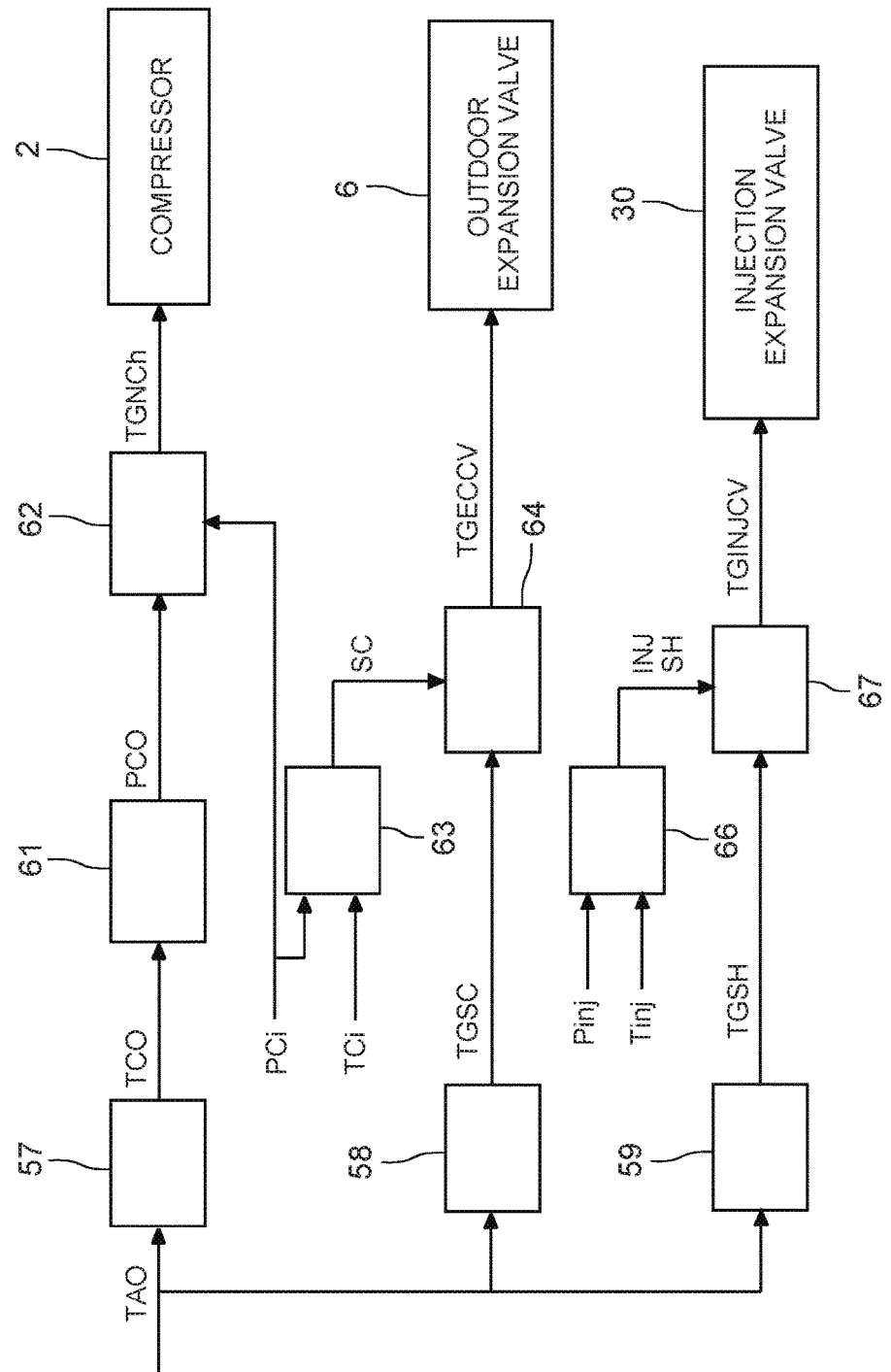
FIG. 4 is a control block diagram of the controller of FIG. 2 during heating.
Figure 5:
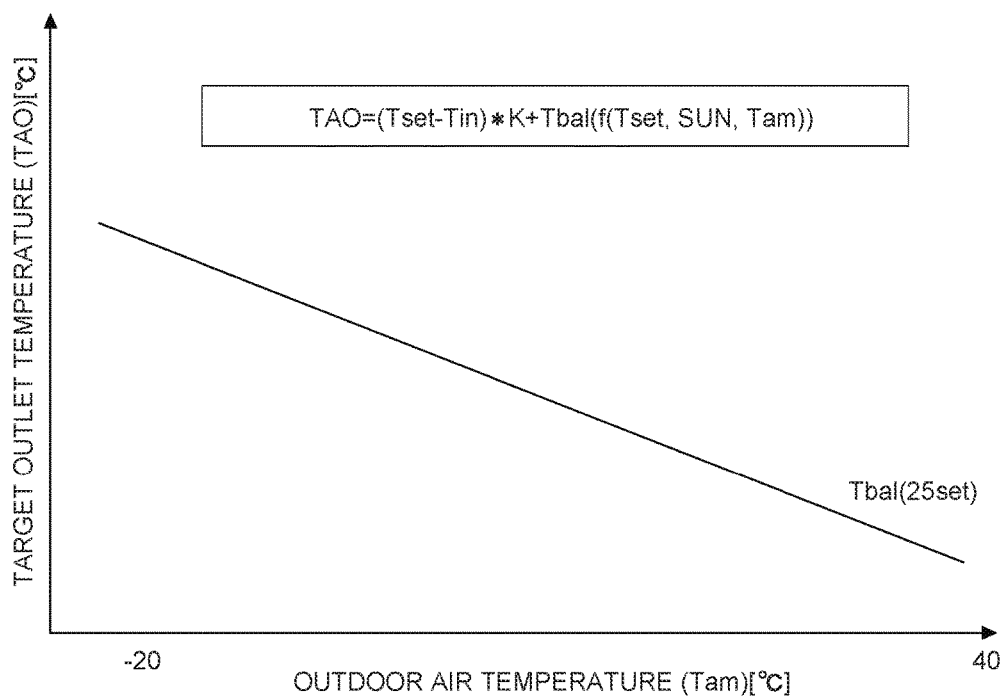
FIG. 5 is a diagram to explain determination of a target outlet temperature by the controller of FIG. 2.

FIG. 4 shows a control block diagram of the compressor 2, the outdoor expansion valve 6 and the injection expansion valve 30 by the controller 32 in the above heating mode. The controller 32 inputs the target outlet temperature TAO into a target radiator temperature calculating section 57, a target radiator subcool degree calculating section 58 and a target injection refrigerant superheat degree calculating section 59. The target outlet temperature TAO is a target value of a temperature of air blown out from the outlet 29 into the vehicle interior, and calculated from Equation (I) mentioned below by the controller 32.

$$TAO = (Tset - Tin) \times K + Tbal(f(Tset, SUN, Tam)) \quad (I),$$

in which Tset is a set temperature in the vehicle interior which is set by the air conditioning operating portion 53, Tin is a temperature of the air in the vehicle interior which is detected by the indoor air temperature sensor 37, K is a coefficient, and Tbal is a balance value calculated from the set temperature Tset, a solar radiation amount SUN detected by the solar radiation sensor 51, and an outdoor air temperature Tam detected by the outdoor air temperature sensor 33. Further, in general, the lower the outdoor air temperature Tam is, the higher the target outlet temperature TAO becomes, and the higher the outdoor air temperature Tam is, the lower the target outlet temperature becomes as shown in FIG. 5.

The target radiator temperature calculating section 57 of the controller 32 calculates a target radiator temperature TCO from the target outlet temperature TAO, and next a target radiator pressure calculating section 61 of the controller 32 calculates a target radiator pressure PCO on the basis of the target radiator temperature TCO. Further, on the basis of the target radiator pressure PCO and a pressure (a radiator pressure) Pci of the radiator 4 which is the high pressure of the refrigerant circuit R detected by the radiator pressure sensor 47, a compressor revolution number calculating section 62 of the controller 32 calculates a target compressor revolution number TGNCh of the compressor 2 in the heating mode, and operates the compressor 2 in the target compressor revolution number TGNCh.

Figure 6:
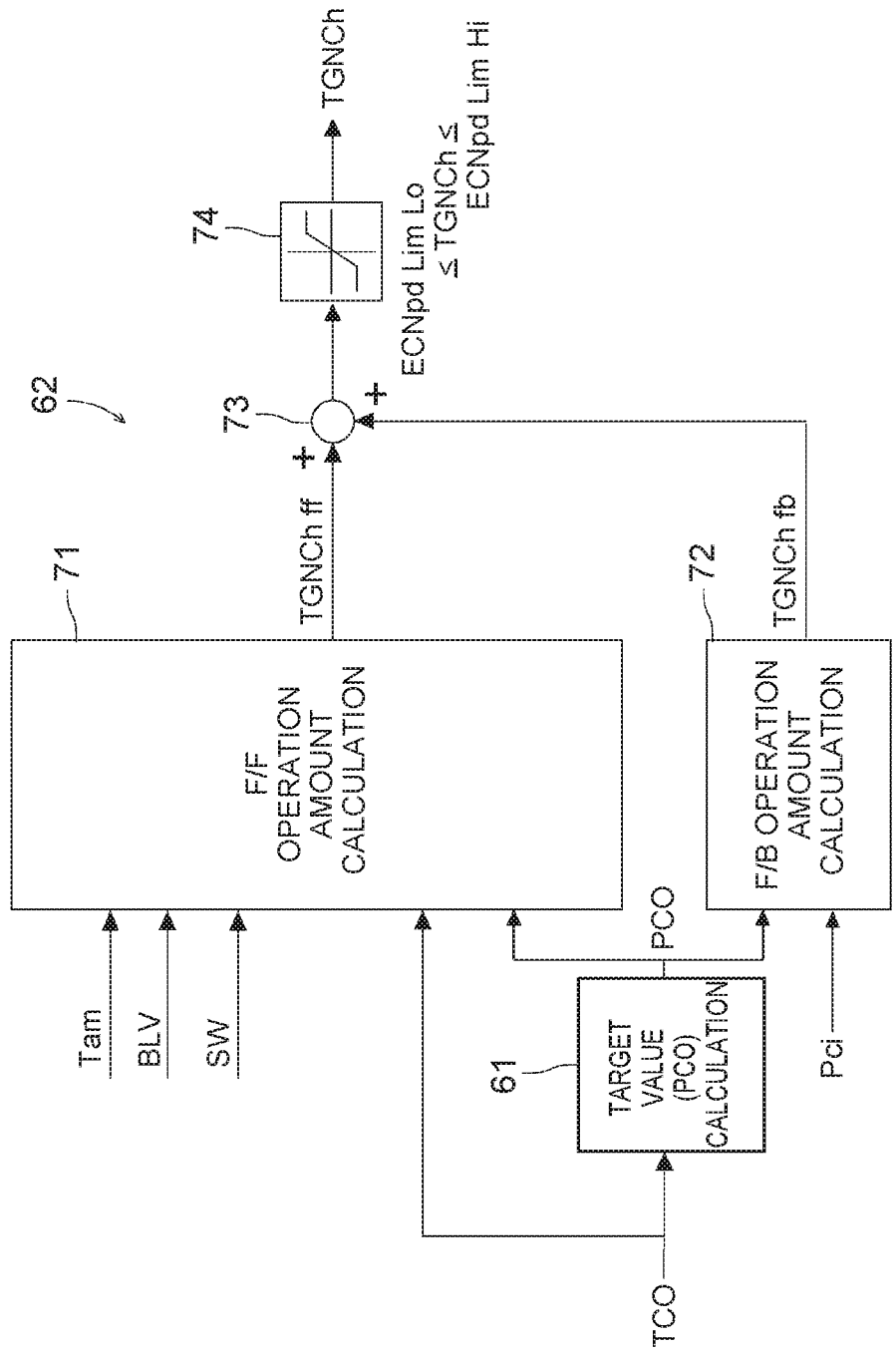
FIG. 6 is a control block diagram of a compressor revolution number calculating section of FIG. 4.

FIG. 6 is a control block diagram of the compressor revolution number calculating section 62. The compressor revolution number calculating section 62 is constituted of an F/F (feedforward) operation amount calculating portion 71, an F/B (feedback) operation amount calculating portion 72, an adder 73, and a limit setting portion 74. The target radiator temperature TCO calculated by the target radiator temperature calculating section 57 of FIG. 4 is input into the target radiator pressure calculating section 61 and the F/F operation amount calculating portion 71. As described above, the target radiator pressure calculating section 61 calculates the target radiator pressure PCO, and the calculated target radiator pressure PCO is input into the F/F operation amount calculating portion 71 and the F/B operation amount calculating portion 72 of the compressor revolution number calculating section 62.

The F/F operation amount calculating portion 71 calculates an F/F operation amount TGNChff of a target compressor revolution number on the basis of the outdoor air temperature Tam obtained from the outdoor air temperature sensor 33, a blower voltage BLV of the indoor blower 27, an air mix damper opening SW of the air mix damper 28 which is obtained by SW=(TAO−Te)/(TH−Te), and the target radiator pressure PCO.

It is to be noted that TH is a temperature of the radiator 4 (the radiator temperature) which can be obtained from the radiator temperature sensor 46, and Te is a temperature of the heat absorber 9 (the heat absorber temperature) which can be obtained from the heat absorber temperature sensor 48. Additionally, the air mix damper opening SW changes in a range of 0≤SW≤1, an air mix shut off state where the air is not passed through the radiator 4 is obtained at 0, and an air mix fully open state where all the air in the air flow passage 3 is passed through the radiator 4 is obtained at 1.

The F/B operation amount calculating portion 72 calculates an F/B operation amount TGNChfb of the target compressor revolution number on the basis of the target radiator pressure PCO and the radiator pressure Pci. Further, the F/F operation amount TGNChff calculated by the F/F operation amount calculating portion 71 and the F/B operation amount TGNChfb calculated by the F/B operation amount calculating portion 72 are added by the adder 73, limits of a controlling upper limit value (ECNpdLimHi) and a controlling lower limit value (ECNpdLimLo) are attached by the limit setting portion 74, and then the target compressor revolution number TGNCh is determined. In the heating mode (also including the dehumidifying and heating mode), the controller 32 controls the revolution number of the compressor 2 on the basis of the target compressor revolution number TGNCh.

That is, in the heating mode (also including the dehumidifying and heating mode) in which the refrigerant radiates heat in the radiator 4 to heat the vehicle interior, the target compressor revolution number TGNCh of the compressor 2 is determined on the basis of the target radiator pressure PCO (the target value of the high pressure).

(9) Gas Injection Control

Additionally, the target injection refrigerant superheat degree calculating section 59 of FIG. 4 of the controller 32 calculates a target value (a target injection refrigerant superheat degree TGSH) of the superheat degree of the injection refrigerant to be returned from the injection circuit 40 to the middle of the compression by the compressor 2, on the basis of the target outlet temperature TAO. On the other hand, an injection refrigerant superheat degree calculating section 66 of the controller 32 calculates a superheat degree INJSH of the injection refrigerant on the basis of a pressure (an injection refrigerant pressure Pinj) of the injection refrigerant which is detected by the injection pressure sensor 50 and a temperature (an injection refrigerant temperature Tinj) of the injection refrigerant which is detected by the injection temperature sensor 55.

Further, on the basis of the injection refrigerant superheat degree INJSH and the target injection refrigerant superheat degree TGSH, a target injection expansion valve position calculating section 67 calculates a target valve position (a target injection expansion valve position TGINJCV) of the injection expansion valve 30. Further, the controller 32 controls the valve position of the injection expansion valve 30 into the target injection expansion valve position TGINJCV.

The target injection refrigerant superheat degree calculating section 59 lowers the target injection refrigerant superheat degree TGSH, for example, as the target outlet temperature TAO heightens (hysteresis is present). When the target injection refrigerant superheat degree TGSH is lowered, it is meant that the valve position of the injection expansion valve 30 is enlarged to increase the injection amount. That is, the higher the target outlet temperature TAO is, the more the controller 32 increases the injection amount to be returned to the compressor 2 and increases the amount of the refrigerant to be discharged from the compressor 2 to increase the heating capability, by the injection expansion valve 30.

Additionally, the controller 32 uses Equation (II), Equation (III), and Equation (IV) to calculate a target heating capability (a required heating capability) TGQ which is a required heating capability of the radiator 4, an HP maximum heating capability estimated value QmaxHP which can be generated by the radiator 4 when the refrigerant is not passed through the injection circuit 40, i.e., when the gas injection is not performed, and an INJ maximum heating capability estimated value QmaxINJ which can be generated by the radiator 4 when the refrigerant is passed through the injection circuit 40, i.e., when the gas injection is performed.

$$TGQ = (TCO - Te) \times Cpa \times \rho \times Qair \quad \text{(II)},$$

$$QmaxHP = f1(Tam, Nc, BLV, VSP, Te) \quad \text{(III), and}$$

$$QmaxINJ = f2(Tam, Nc, BLV, VSP, Te) \quad \text{(IV)},$$

in which Te is the temperature of the heat absorber 9 which is detected by the heat absorber temperature sensor 48, Cpa is specific heat [kj/kg·K] of the air flowing into the radiator 4, $\rho$ is a density (a specific volume) [kg/m$^3$] of the air flowing into the radiator 4, Qair is a volume [m$^3$/h] of the air passing the radiator 4 (the passing air volume Qair is estimated from the blower voltage BLV of the indoor blower 27 or the like), and VSP is the vehicle speed obtained from the velocity sensor 52.

It is to be noted that in Equation (II), in place of or in addition to Qair, the temperature of the air flowing into the radiator 4 or the temperature of the air flowing out from the radiator 4 may be employed. In addition, the revolution number Nc of the compressor 2 of Equations (III) and (IV) is an example of an index indicating a refrigerant flow rate, the blower voltage BLV is an example of an index indicating the air volume in the air flow passage 3, and the heating capability estimated values QmaxHP and QmaxINJ are calculated from a function of these indexes. Additionally, the values may be calculated from these indexes and one of an outlet refrigerant pressure of the radiator 4, an outlet refrigerant temperature of the radiator 4, an inlet refrigerant pressure of the radiator 4, and an inlet refrigerant temperature of the radiator 4, or any combination of them.

Further, when the target heating capability TGQ is the HP maximum heating capability estimated value QmaxHP or less, the controller 32 executes control without injection. In this case, the controller 32 shuts off the injection expansion valve 30 (the shut off position), and does not pass the refrigerant through the injection circuit 40. On the other hand, when the target heating capability TGQ is in excess of the HP maximum heating capability estimated value QmaxHP, i.e., when the HP maximum heating capability estimated value QmaxHP by the radiator 4 runs short to the target heating capability TGQ, the control with the injection is performed, and the gas injection is executed. In this case, the controller 32 defines the valve position of the injection expansion valve 30 as a predetermined value to open the valve, and performs the gas injection to the compressor 2. That is, as described above, the controller 32 controls the valve position of the injection expansion valve 30 into the target injection expansion valve position TGINJCV.

(10) Control of Target Radiator Subcool Degree

Furthermore, the target radiator subcool degree calculating section 58 of the controller 32 calculates a target radiator subcool degree TGSC of the radiator 4 on the basis of the target outlet temperature TAO. The target radiator subcool degree calculating section 58 will be described later in detail. On the other hand, a radiator subcool degree calculating section 63 of the controller 32 calculates the subcool degree (the radiator subcool degree SC) of the refrigerant in the radiator 4 on the basis of the radiator pressure Pci and a temperature (a radiator temperature Tci) of the radiator 4 which is detected by the radiator temperature sensor 46. Further, on the basis of the radiator subcool degree SC and the target radiator subcool degree TGSC, a target outdoor expansion valve position calculating section 64 calculates a target valve position (a target outdoor expansion valve position TGECCV) of the outdoor expansion valve 6. Further, the controller 32 controls the valve position of the outdoor expansion valve 6 into the target outdoor expansion valve position TGECCV.

Figure 7:
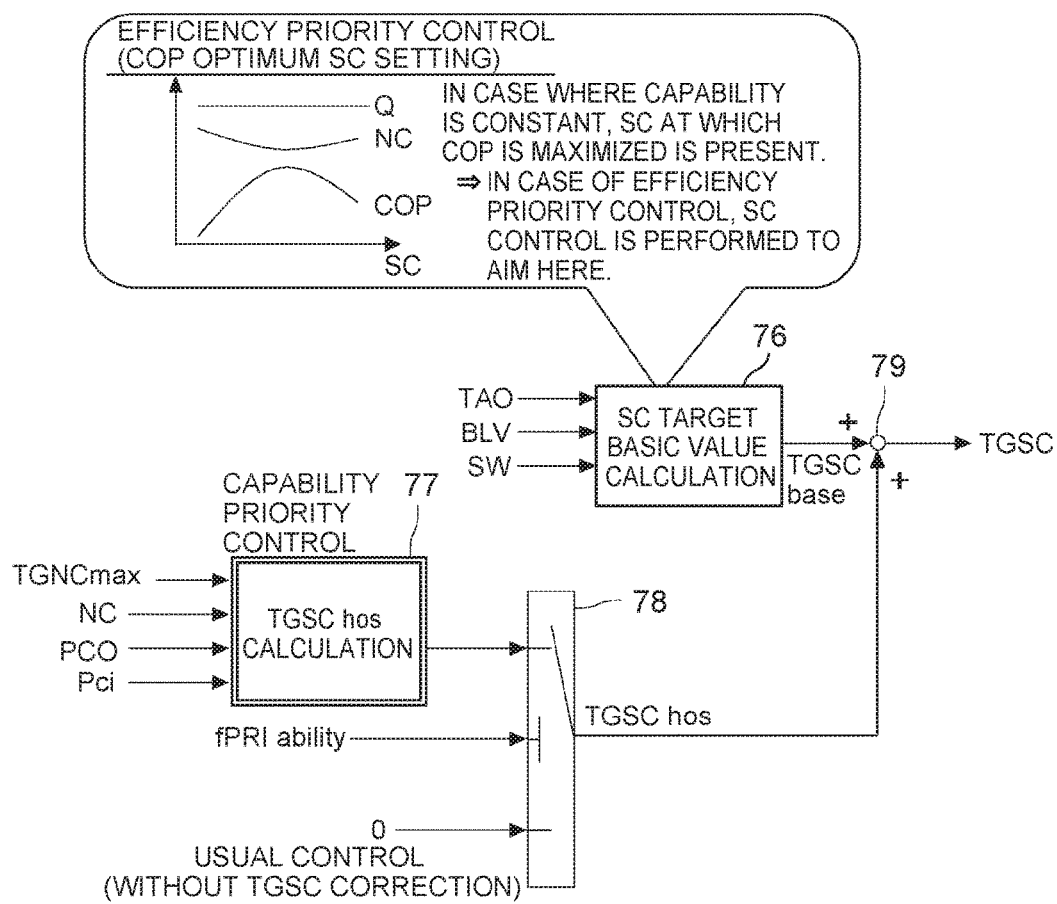
FIG. 7 is a control block diagram concerning determination of a target radiator subcool degree by the controller of FIG. 2.

Next, a constitution and an operation of the target radiator subcool degree calculating section 58 of FIG. 4 will be described with reference to FIG. 7 to FIG. 11. As shown in FIG. 7, the target radiator subcool degree calculating section 58 is constituted of an SC target basic value calculating portion 76, a target radiator subcool degree correction value calculating portion 77, a correction permission/inhibition changing portion 78, and an adder 79. The controller 32 comprises two control states of efficiency priority control and capability priority control in this heating mode, and changes the state depending on whether a capability priority flag fPRIability is "1" (set) or "0" (reset). The adder 79 adds a target radiator subcool degree basic value TGSCbase calculated by the SC target basic value calculating portion 76 as described later and a target radiator subcool degree correction value TGSChos from the correction permission/inhibition changing portion 78.

Into the correction permission/inhibition changing portion 78, there are input the target radiator subcool degree correction value TGSChos calculated by the target radiator subcool degree correction value calculating portion 77 as described later and "0". Furthermore, when the capability priority flag fPRIability mentioned above is "1" (set), the target radiator subcool degree correction value TGSChos calculated by the target radiator subcool degree correction value calculating portion 77 is output from the correction permission/inhibition changing portion 78 to the adder 79, and when the capability priority flag fPRIability is "0" (reset), "0" (usual control without correction) is output from the correction permission/inhibition changing portion 78 to the adder 79.

That is, in the capability priority control in which the capability priority flag fPRIability is "1" (set), the target radiator subcool degree correction value TGSChos calculated by the target radiator subcool degree correction value calculating portion 77 is added to the target radiator subcool degree basic value TGSCbase calculated by the SC target basic value calculating portion 76 to obtain a value of the target radiator subcool degree TGSC (TGSC=TGSCbase+TGSChos), and in the efficiency priority control in which the capability priority flag fPRIability is "0" (reset), a value obtained by adding the target radiator subcool degree correction value TGSChos of "0" from the correction permission/inhibition changing portion 78 to the target radiator subcool degree basic value TGSCbase calculated by the SC target basic value calculating portion 76, i.e., the target radiator subcool degree basic value TGSCbase becomes the target radiator subcool degree TGSC (TGSC=TGSCbase).

(10-1) Efficiency Priority Control

The controller 32 mentioned above executes the efficiency priority control usually (the capability priority flag fPRIability="0"). That is, the SC target basic value calculating portion 76 calculates the target radiator subcool degree basic value TGSCbase on the basis of the outdoor air temperature Tam obtained from the outdoor air temperature sensor 33, the blower voltage BLV of the indoor blower 27, and the air mix damper opening SW of the air mix damper 28 which is obtained by SW=(TAO−Te)/(TH−Te). At this time, the volume Qair [m³/h] of the air to be passed through the radiator 4 is similarly estimated from the blower voltage BLV of the indoor blower 27 or the like as described above.

Figure 8:
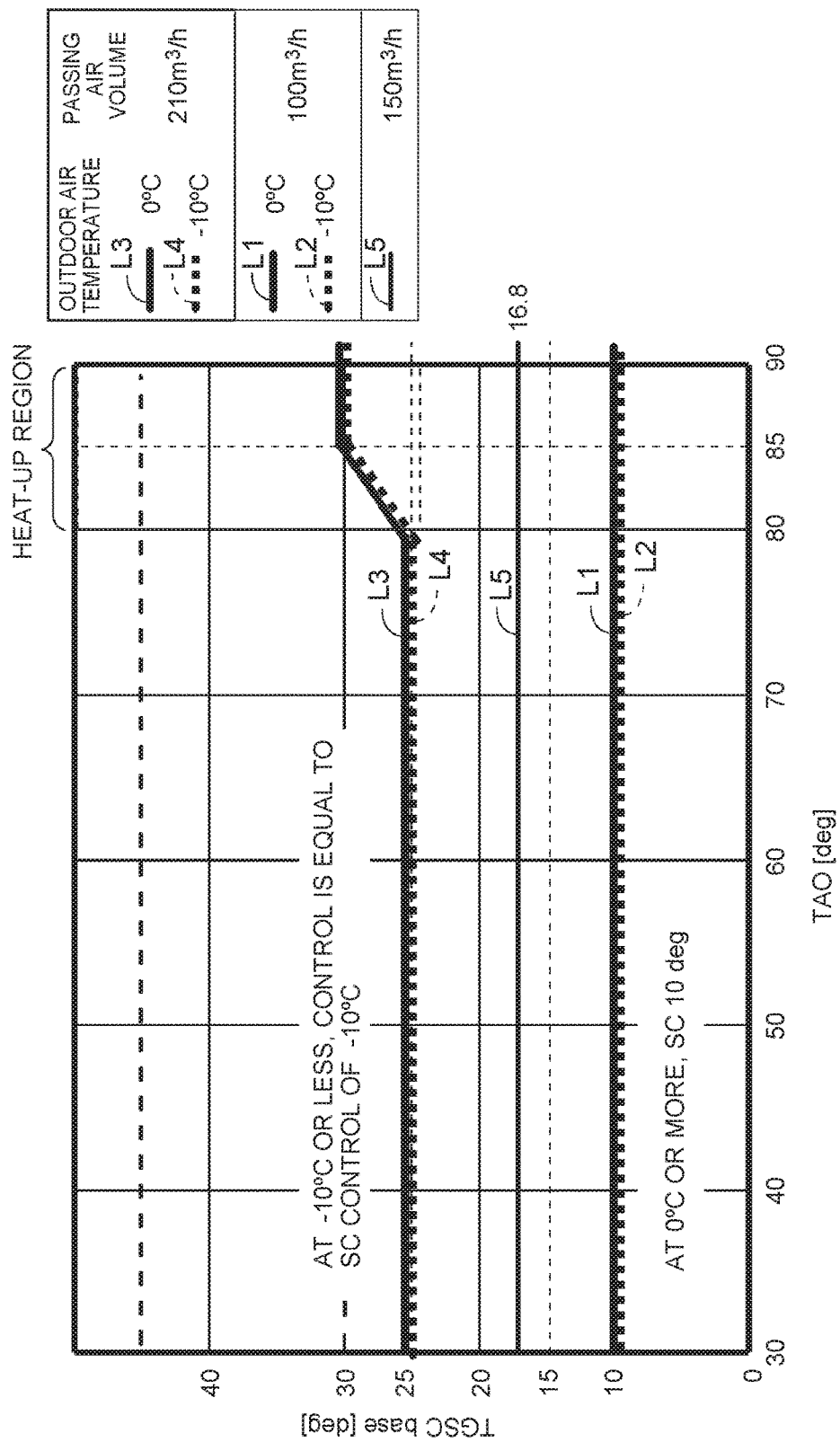
FIG. 8 is a diagram to explain a determining method of the target radiator subcool degree during efficiency priority control by the controller of FIG. 2.

Here, when the heating capability is constant, the radiator subcool degree SC in which an operation efficiency COP is maximized is present. In the case of the efficiency priority control, for the purpose of prioritizing the operation efficiency, the SC target basic value calculating portion 76 aims at a point at which this COP is maximized, thereby calculating the target radiator subcool degree basic value TGSCbase. FIG. 8 shows this behavior. In a case where the volume Qair of the air to be passed through the radiator 4 is 100 m³/h, even when the outdoor air temperature Tam is 0° C. (L1) or −10° C. (L2), the SC target basic value calculating portion 76 determines that the target radiator subcool degree basic value TGSCbase is 10 (deg) at all the target outlet temperatures TAO. It is to be noted that when the outdoor air temperature is 0° C. or less, the basic value is 10 deg.

Additionally, in a case where the volume Qair of the air to be passed through the radiator 4 is 200 m³/h, even when the outdoor air temperature Tam is 0° C. (L3) or −10° C. (L4), the SC target basic value calculating portion 76 determines that the target radiator subcool degree basic value TGSCbase is 25 (deg) at all the target outlet temperatures TAO of 30 (deg) to 80 (deg), but the calculating portion gradually raises the temperature to 30 (deg) in a heat-up region where the target outlet temperature TAO is higher than 80 (deg). It is to be noted that when the outdoor air temperature is −10° C. or less, the basic value is the same as in −10° C. Additionally, in a case where the passing air volume Qair is 150 m³/h, the SC target basic value calculating portion 76 determines that the target radiator subcool degree basic value TGSCbase is 16.8 (deg, L5) at all the target outlet temperatures TAO.

Thus, the SC target basic value calculating portion 76 calculates the target radiator subcool degree basic value TGSCbase on the basis of the volume Qair of the air to be passed through the radiator 4, to aim at the maximum efficiency. In the efficiency priority control, "0" is input from the correction permission/inhibition changing portion 78 into the adder 79, and hence the calculated target radiator subcool degree basic value TGSCbase becomes the target radiator subcool degree TGSC. Further, on the basis of the target radiator subcool degree TGSC and the radiator subcool degree SC calculated by the radiator subcool degree calculating section 63, the target outdoor expansion valve position TGECCV of the outdoor expansion valve 6 is calculated as described above, and the valve position of the outdoor expansion valve 6 is controlled into this calculated target outdoor expansion valve position TGECCV.

(10-2) Capability Priority Control

Next, the abovementioned capability priority control will be described. As described above, the controller 32 usually executes the efficiency priority control, but when the capability priority flag fPRIability is "1" (set), the controller shifts to the capability priority control.

(10-2-1) Set/Reset of Capability Priority Flag fPRIability

Next, switching of the efficiency priority control and the capability priority control will be described. First, in the case of the abovementioned control without the injection by the injection circuit 40, when all conditions (capability priority requirement conditions) mentioned below are established, the capability priority flag fPRIability="1" (set), the controller shifts to the capability priority control. That is, the following state continues for a predetermined time or more:

TGQ>QmaxHP (e.g., 4 kW);

(TGNCmax−NC)≥ΔN1 (e.g., 100 rpm);

Tam<A1 (e.g., −10° C.); and (TCO−TH)≥ΔT1 (e.g., 5 deg).

It is to be noted that TGNCmax is a target compressor revolution number upper limit value, is ECNpdLimHi mentioned above, and is the upper limit value of controlling of a revolution number NC of the compressor 2.

Additionally, in the case of the abovementioned control with the injection, the above conditions are established as follows. That is, the following state continues for a predetermined time or more:

TGQ>QmaxINJ (e.g., 5 kW);
(TGNCmax−NC)≥ΔN2 (e.g., 100 rpm);
Tam<A2 (e.g., −15° C.); and
(TCO−TH)≥ΔT1 (e.g., 5 deg).

That is, when the heating capability by the radiator 4 runs short, the target heating capability TGQ is larger than the HP maximum heating capability estimated value QmaxHP or the INJ maximum heating capability estimated value QmaxINJ and the revolution number of the compressor 2 is still lower than the upper limit value of controlling, the controller 32 sets the capability priority flag fPRIability to "1" and shifts to the capability priority control on the conditions that there continues a state where the outdoor air temperature Tam is low and the radiator temperature TH is also lower than the target radiator temperature TCO as much as a predetermined value or more.

Additionally, in the case of the control without the injection and with the injection, as described above, the heating capability by the radiator 4 varies, and the INJ maximum heating capability estimated value QmaxINJ is also larger than the HP maximum heating capability estimated value QmaxHP. Therefore, shifting conditions are changed, and the outdoor air temperature Tam is established at a lower value. It is to be noted that in the case of the control with the injection, the target heating capability is large, and hence in this situation, the capability priority flag fPRIability may be set without any conditions.

Next, conditions to reset the capability priority flag fPRIability to "0" are as follows. That is, at the control without the injection, all the following conditions (capability priority cancellation conditions) mentioned below are established, and after elapse of predetermined time, the capability priority flag fPRIability is reset to "0", and the capability priority control is cancelled to shift to the efficiency priority control. That is, TGQ<QmaxHP (e.g., 4 kW)−0.5 kW;
(TCO−TH)<ΔT2 (e.g., 2 deg); and
TGSChos<SC (e.g., 3 deg), Additionally, at the control with the injection, conditions are as follows:

TGQ<QmaxINJ (e.g., 5 kW)−0.5 kW;
(TCO−TH)<ΔT2 (e.g., 2 deg); and
TGSChos<SC (e.g., 3 deg).

That is, the shortage of the heating capability by the radiator 4 is eliminated, the HP maximum heating capability estimated value QmaxHP or the INJ maximum heating capability estimated value QmaxINJ is larger than the target heating capability TGQ, a difference between the radiator temperature TH and the target radiator temperature TCO is reduced to be smaller than a predetermined value, and the target radiator subcool degree correction value TGSChos decreases. On conditions that the above state is continued, the controller 32 resets the capability priority flag fPRIability to "0" and cancels the capability priority control to return to the efficiency priority control.

(10-2-2) Calculation of Target Radiator Subcool Degree Correction Value

Next, there will be described the calculation of the target radiator subcool degree correction value TGSChos in the target radiator subcool degree correction value calculating portion 77. Into the target radiator subcool degree correction value calculating portion 77, there are input the target compressor revolution number upper limit value TGNCmax (the upper limit value of controlling of the revolution number of the compressor 2), the revolution number NC of the compressor 2, the target radiator pressure PCO (the target value of the high pressure), and the radiator pressure Pci.

Figure 9:
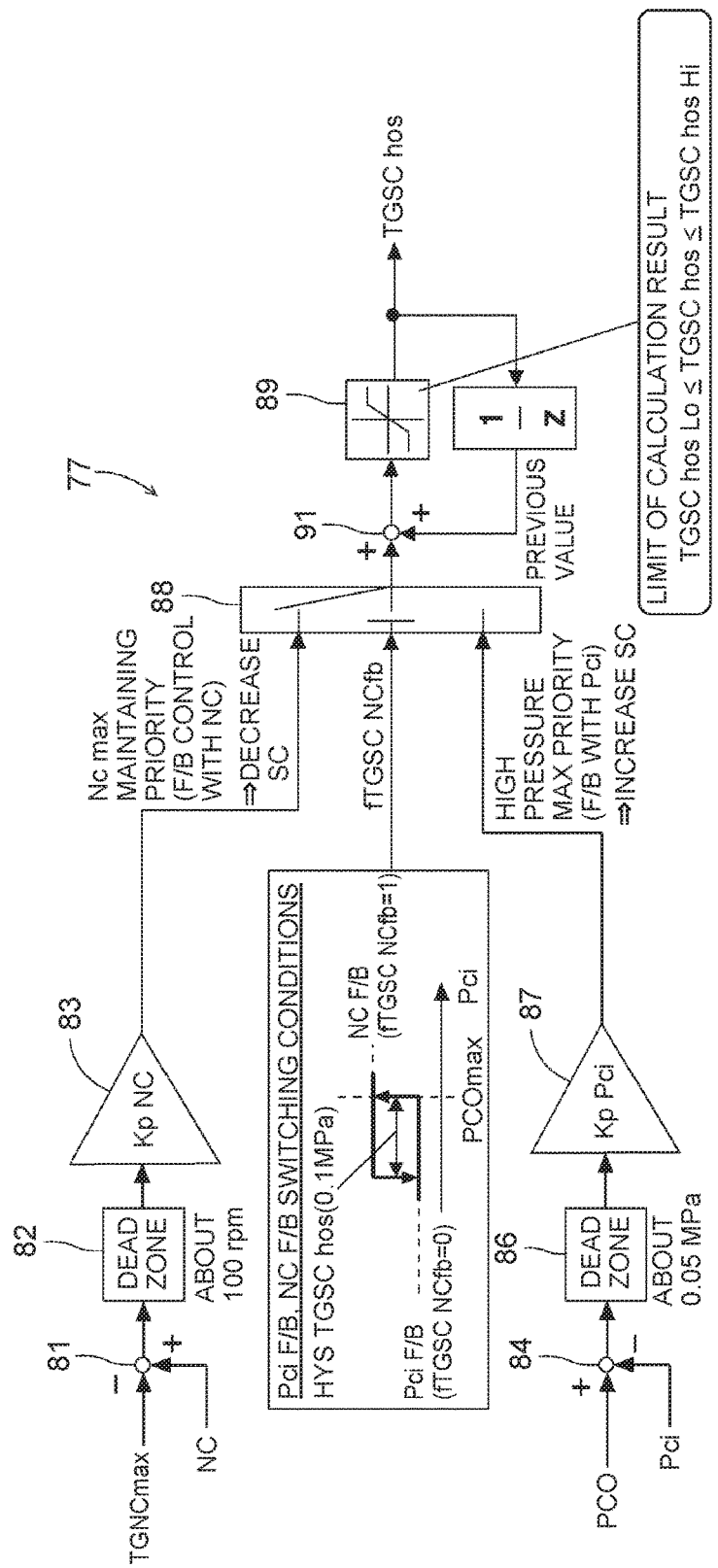
FIG. 9 is a control block diagram concerning correction of the target radiator subcool degree during capability priority control by the controller of FIG. 2.

FIG. 9 shows a control block diagram of the target radiator subcool degree correction value calculating portion 77. In this capability priority control, the controller 32 has a high pressure priority mode and a revolution number priority mode and switches and executes these two modes, but a subtracter 81, a dead zone processing portion 82 and an amplifier 83 in FIG. 9 constitute an execution block of the revolution number priority mode, and a subtracter 84, a dead zone processing portion 86 and an amplifier 87 constitute an execution block of the high pressure priority mode. Outputs of the respective amplifiers 83 and 87 are input into a priority mode switching portion 88, and these modes are switched by setting a priority mode flag fTGSCNCfb to "1" and resetting the flag to "0", to be output to an adder 91. The previous value is added by the adder 91, a limit setting portion 89 makes limits of a controlling upper limit value (TGSChosHi) and a controlling lower limit value (TGSChosLo), and then the target radiator subcool degree correction value TGSChos is determined.

That is, in the revolution number priority mode, the target compressor revolution number upper limit value TGNCmax (the upper limit value of controlling of the revolution number of the compressor 2) is input as a minus (−) and the revolution number NC of the compressor 2 is input as a plus (+) into the subtracter 81, and its deviation e is supplied through the dead zone processing portion 82 (e.g., 100 rpm is a dead zone) and amplified by the amplifier 83 to be input into the priority mode switching portion 88. That is, feedback (I component) control of the target compressor revolution number upper limit value TGNCmax is performed to the revolution number NC. An output value of the amplifier 83 is the target radiator subcool degree correction value TGSChos to decrease the radiator subcool degree SC in a direction in which the revolution number NC of the compressor 2 is increased, thereby finally adjusting the revolution number NC of the compressor 2 into the target compressor revolution number upper limit value (the upper limit value of controlling) TGNCmax. Consequently, in this revolution number priority mode, on the basis of the deviation e between the target compressor revolution number upper limit value (the upper limit value of controlling) TGNCmax and the actual revolution number NC of the compressor 2, the target radiator subcool degree correction value TGSChos is calculated, and feedback correction of the target radiator subcool degree TGSC is performed.

Additionally, in the high pressure priority mode, the radiator pressure Pci is input as a minus (−) and the target radiator pressure PCO (the target value of the high pressure) is input as a plus (+) into the subtracter 84, and its deviation e is supplied through the dead zone processing portion 86 (e.g., 0.05 MPa is a dead zone) and amplified by the amplifier 87 to be input into the priority mode switching portion 88. That is, feedback (I component) control of the radiator pressure Pci is performed to the target radiator pressure PCO. An output value of the amplifier 87 is the target radiator subcool degree correction value TGSChos to increase the radiator subcool degree SC in a direction in which the radiator pressure Pci (the high pressure) is increased, thereby finally adjusting the radiator pressure Pci (the high pressure) into a controlling upper limit value PCOmax of the target radiator pressure PCO. Consequently, in this high pressure priority mode, on the basis of the deviation e between the controlling upper limit value PCOmax of the target radiator pressure PCO (the target value of the high pressure) and the actual radiator pressure (the high pressure) Pci, the target radiator subcool degree correction value TGSChos is calculated, and the feedback correction of the target radiator subcool degree TGSC is performed.

(10-2-3) Switching Conditions of High Pressure Priority Mode and Revolution Number Priority Mode As described above, the high pressure priority mode and the revolution number priority mode are switched by setting the priority mode flag fTGSCNCfb to "1" and resetting the flag to "0". The controller 32 sets the priority mode flag fTGSCNCfb to a state of the reset "0" until the radiator pressure Pci reaches the controlling upper limit value PCOmax, and sets the flag to "1" when the pressure reaches PCOmax. Afterward, when the radiator pressure Pci decreases as much as a predetermined hysteresis (e.g., 0.1 MPa or the like), the priority mode flag fTGSCNCfb is reset to "0".

(11) Actual Radiator Subcool Degree SC Control Operation

Figure 10:
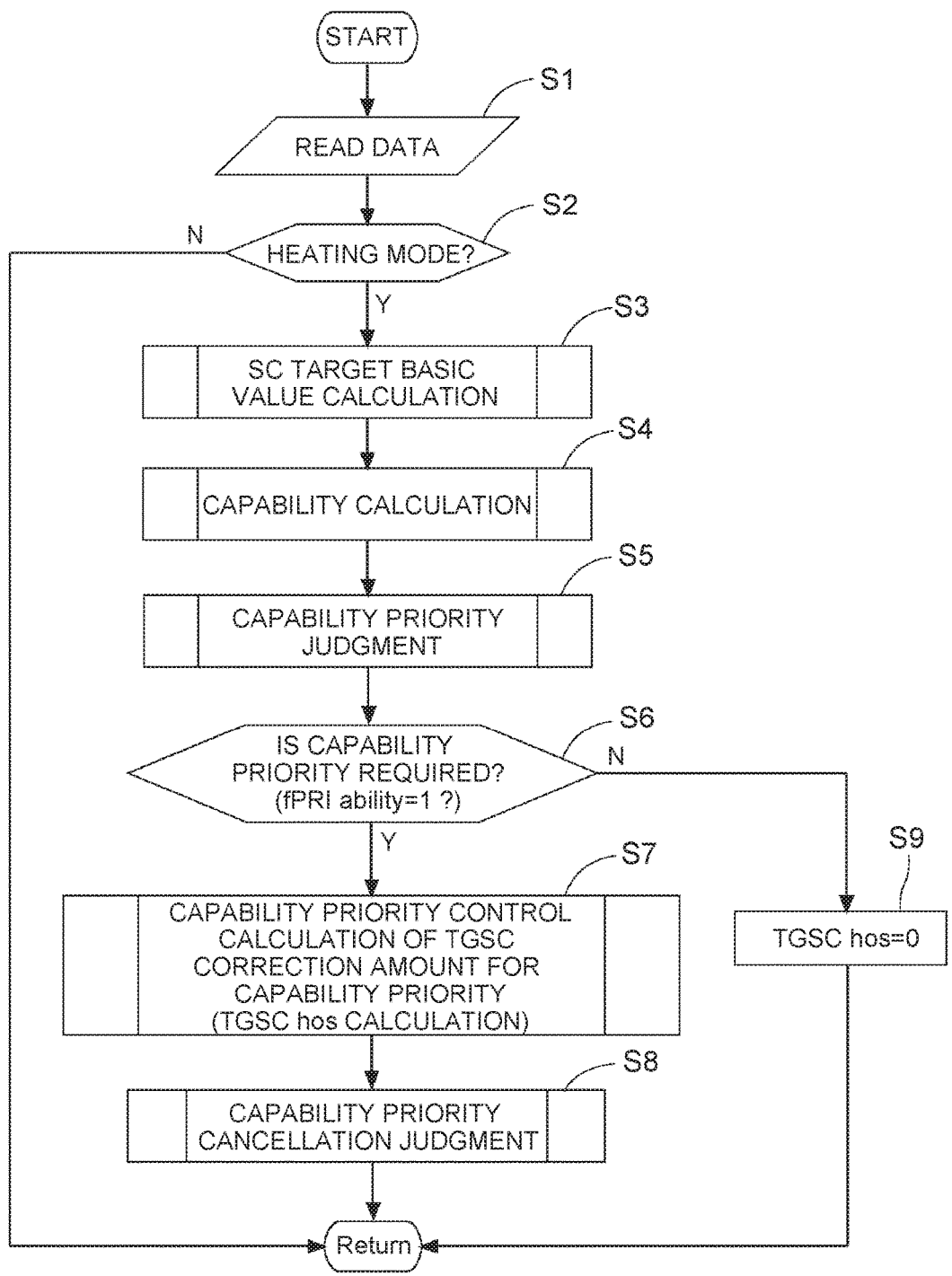
FIG. 10 is a flowchart to explain an operation of the controller of FIG. 2.

Actualities of the abovementioned switching of the efficiency priority control and the capability priority control and the switching of the priority mode will be described with reference to FIG. 10 and FIG. 11. In step S1 of FIG. 10, the controller 32 reads each data (temperature data and pressure data), and in step S2, the controller judges whether it is the heating mode at present. In the case of the heating mode, the controller 32 advances from the step S2 to step S3, and the SC target basic value calculating portion 76 calculates the target radiator subcool degree basic value TGSCbase as described above. Next, in step S4, the controller calculates the target heating capability (a required heating capability) TGQ, the HP maximum heating capability estimated value QmaxHP, and the INJ maximum heating capability estimated value QmaxINJ, and in step S5, the controller judges whether or not all the conditions for the capability priority flag fPRIability="1" (set) are established.

Further, in a case where all the conditions are not established in step S6, it is judged that the capability priority control is not required, the capability priority flag fPRIability is reset to "0", and the controller advances to step S9, in which the target radiator subcool degree correction value TGSChos=0. In this case, the efficiency priority control is performed, and the target radiator subcool degree basic value TGSCbase becomes the target radiator subcool degree TGSC.

Figure 11:
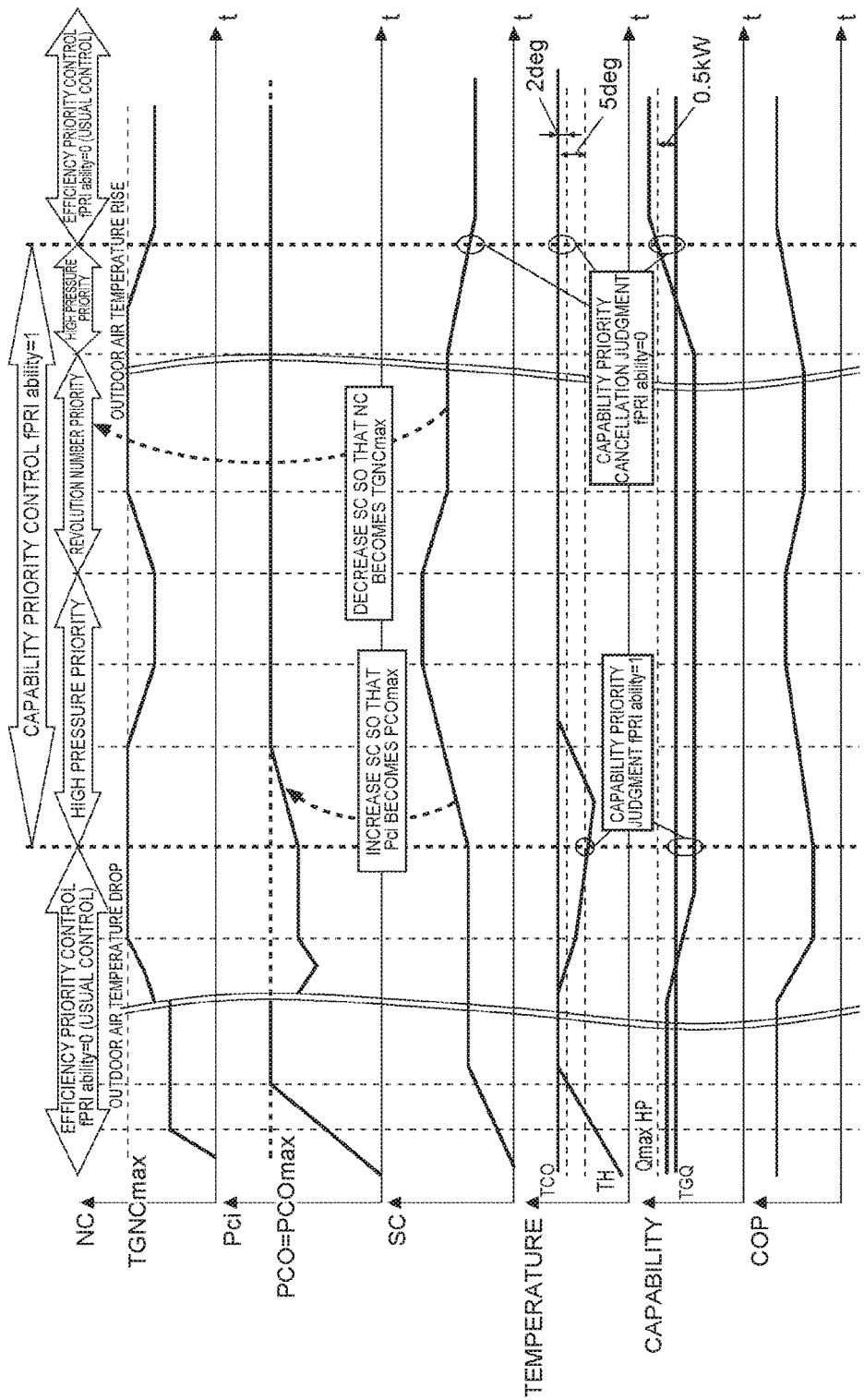
FIG. 11 is a timing chart to explain the operation of the controller of FIG. 2.

While such efficiency priority control is executed, in a case where due to drop of the outdoor air temperature or the like, as shown in FIG. 11, for example, the HP maximum heating capability estimated value QmaxHP is below the target heating capability TGQ and all the conditions (the capability priority requirement conditions) for the capability priority flag fPRIability="1" (set) are established, the controller 32 obtains the capability priority flag fPRIability="1" (set) in the step S6, and advances to step S7, thereby executing the abovementioned capability priority control.

When the controller shifts to this capability priority control, the radiator pressure Pci (the high pressure) is lower than the controlling upper limit value PCOmax of the target radiator pressure PCO, and hence the controller 32 resets the priority mode switching flag fTGSCNCfb to "0" to execute the high pressure priority mode. In this high pressure priority mode, as described above, the target radiator subcool degree correction value TGSChos is a value to increase the target radiator subcool degree TGSC, and hence, as shown in FIG. 11, the radiator subcool degree SC rises, and the radiator pressure Pci (the high pressure) rises up to the controlling upper limit value PCOmax.

In a case where the radiator pressure Pci (the high pressure) rises up to the controlling upper limit value PCOmax, the controller 32 sets the priority mode switching flag fTGSCNCfb to "1", and hence the controller shifts to the revolution number priority mode this time. In this revolution number priority mode, as described above, the target radiator subcool degree correction value TGSChos is a value to decrease the target radiator subcool degree TGSC, and hence the radiator subcool degree SC decreases as shown in FIG. 11. When the radiator subcool degree SC decreases, the radiator pressure Pci also decreases, and hence the controller 32 increases the revolution number NC of the compressor 2 up to the controlling upper limit value TGNCmax of a target compressor revolution number TGNC. In consequence, the refrigerant flow rate increases.

In this state, when the radiator pressure Pci (the high pressure) decreases as much as a hysteresis of 0.1 MPa, the controller 32 resets the priority mode switching flag fTGSCNCfb to "0" again, and hence the priority mode returns to the high pressure priority mode again.

While such capability priority control is executed, for example, in a case where the outdoor air temperature rises and all the conditions (the capability priority cancellation conditions) for the abovementioned capability priority flag fPRIability="0" (reset) are established, the controller 32 judges the capability priority flag fPRIability="0" (reset) in step S8, and returns to the efficiency priority control.

(12) Another Example of Correction Control of Target Radiator Subcool Degree

Figure 12:
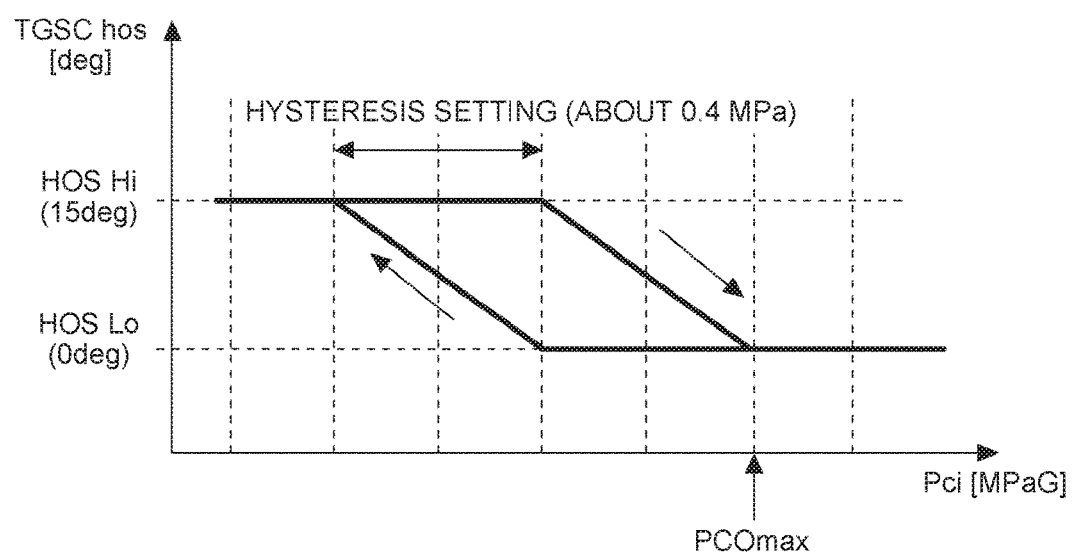
FIG. 12 is a diagram to explain a target radiator subcool degree correcting operation of another embodiment of the controller of FIG. 2.

Next, FIG. 12 shows another example of correction control of the target radiator subcool degree TGSC of the radiator 4. In this case, the controller 32 determines the target radiator subcool degree correction value TGSChos between a correction upper limit value HOSHi (e.g., 15 deg) and a correction lower limit value HOSLo (0 deg) on the basis of a data table in which a hysteresis of about 0.4 MPa is set.

That is, in this embodiment, the controller 32 first adjusts the target radiator subcool degree correction value TGSChos as the correction upper limit value HOSHi in accordance with the table of FIG. 12 to execute the high pressure priority mode in which the radiator pressure Pci (the high pressure) is increased. Further, in a case where the radiator pressure Pci (the high pressure) comes close to the controlling upper limit value PCOmax of the target radiator pressure PCO, the revolution number priority mode is executed to gradually decrease the target radiator subcool degree correction value TGSChos from the correction upper limit value HOSHi to the correction lower limit value HOSLo. Conversely, when the radiator pressure Pci decreases and comes away from the controlling upper limit value PCOmax, the correction value is gradually increased to the correction upper limit value HOSHi again in the high pressure priority mode.

As described above in detail, in the present invention, the controller 32 has the high pressure priority mode to increase the target radiator subcool degree TGSC of the radiator 4 in a direction in which the high pressure (the radiator pressure Pci) is set to a predetermined high value (the controlling upper limit value PCOmax of the target radiator pressure PCO in the embodiment), and the revolution number priority mode to decrease the target radiator subcool degree TGSC of the radiator 4 in a direction in which the revolution number NC of the compressor 2 is set to a predetermined high value (the target compressor revolution number upper limit value TGNCmax which is the upper limit value of controlling in the embodiment), and switches and executes the high pressure priority mode and the revolution number priority mode, thereby changing the target radiator subcool degree TGSC of the radiator 4 so that the revolution number NC of the compressor 2 is maintained to be high while maintaining the high pressure (the radiator pressure Pci) at the predetermined high value (around the controlling upper limit value PCOmax of the target radiator pressure PCO). Consequently, the refrigerant flow rate is also acquired while maintaining the high pressure during the heating, so that it is possible to achieve improvement of the heating capability.

In this case, the controller executes the high pressure priority mode to increase the target radiator subcool degree TGSC of the radiator 4 in the direction in which the high pressure (the radiator pressure Pci) is set to the predetermined high value (the controlling upper limit value PCOmax of the target radiator pressure PCO), shifts to the revolution number priority mode in a case where the high pressure (the radiator pressure Pci) reaches the predetermined high value (the controlling upper limit value PCOmax), and decreases the target radiator subcool degree TGSC of the radiator 4 in the direction in which the revolution number NC of the compressor 2 is set to the predetermined high value (the target compressor revolution number upper limit value TGNCmax), so that the radiator subcool degree SC which satisfies both the high pressure and the refrigerant flow rate can appropriately be controlled.

Especially, in the high pressure priority mode, the target radiator subcool degree TGSC of the radiator 4 is increased in the direction in which the high pressure (the radiator pressure Pci) is set to the controlling upper limit value PCOmax, and in the revolution number priority mode, the target radiator subcool degree TGSC of the radiator 4 is decreased in the direction in which the revolution number NC of the compressor 2 is set to the target compressor revolution number upper limit value TGNCmax (the upper limit value of controlling). Consequently, the revolution number NC of the compressor 2 is increased to also maintain the refrigerant flow rate while appropriately controlling the radiator subcool degree SC to suppress the high pressure to the controlling upper limit value PCOmax or less, so that the heating capability can improve.

In this case, according to the embodiment, in the high pressure priority mode, the feedback correction of the target radiator subcool degree TGSC of the radiator 4 is performed on the basis of the deviation e between the controlling upper limit value PCOmax of the high pressure (the radiator pressure Pci) and the actual high pressure (the radiator pressure Pci), and in the revolution number priority mode, the feedback correction of the target radiator subcool degree TGSC of the radiator 4 is performed on the basis of the deviation e between the target compressor revolution number upper limit value (the upper limit value of controlling) TGNCmax of the revolution number NC of the compressor 2 and the actual revolution number NC, so that it is possible to always stably realize the correction of the refrigerant subcool degree SC of the radiator 4.

Additionally, the controller 32 has the efficiency priority control and the capability priority control, determines the target radiator subcool degree TGSC of the radiator 4 on the basis of the volume of the air to be passed through the radiator 4 in the efficiency priority control, shifts to the capability priority control in the case where the conditions that the heating capability by the radiator 4 runs short are established, executes the high pressure priority mode and the revolution number priority mode in this capability priority control, and corrects the target radiator subcool degree TGSC of the radiator 4. Consequently, the controller always executes the efficiency priority control, and can execute the capability priority control to execute the high pressure priority mode and the revolution number priority mode only in the case where the heating capability of the radiator 4 runs short.

In consequence, as shown in the lowermost stage of FIG. 11, it is possible to achieve the improvement of the heating capability while minimizing deterioration of the operation efficiency COP, and hence the present invention is remarkably suitable in a vehicle such as the electric car or the hybrid car which drives the compressor 2 with the power charged in the battery.

Furthermore, the controller 32 changes the capability priority requirement conditions to shift to the capability priority control in a case where a part of the refrigerant flowing out from the radiator 4 is returned to the compressor 2 by the injection circuit 40 and a case where the part of the refrigerant is not returned to the compressor, and hence it is possible to suitably perform the correction of the radiator subcool degree SC in consideration of the improvement of the heating capability due to the increase of the amount of the refrigerant to be discharged from the compressor 2 by the gas injection.

It is to be noted that in the embodiment, the present invention is applied to the vehicle air conditioner 1 which changes and executes the respective operation modes of the heating mode, the dehumidifying and heating mode, the dehumidifying and cooling mode and the cooling mode, but the present invention is not limited to the embodiment, and the present invention is also effective for a vehicle air conditioner which only performs the heating mode.

Additionally, the constitution or each numeric value of the refrigerant circuit R described in the above embodiment are not limited to the embodiment, and needless to say, they can be changed without departing from the gist of the present invention. For example, the predetermined high value in the high pressure priority mode does not have to be the controlling upper limit value PCOmax of the target radiator pressure PCO, and may be a lower predetermined high value, and the predetermined high value in the revolution number priority mode also does not have to be the controlling upper limit value TGNCmax of the target compressor revolution number TGNC, and may be a lower predetermined high value.

DESCRIPTION OF REFERENCE NUMERALS 1 vehicle air conditioner
2 compressor
3 air flow passage
4 radiator
6 outdoor expansion valve
7 outdoor heat exchanger
8 indoor expansion valve
9 heat absorber
11 evaporation capability control valve
17, 20, 21 and 22 solenoid valve
26 suction changing damper
27 indoor blower (blower fan)
28 air mix damper
32 controller (control means)
30 and 70 expansion valve
40 injection circuit
35 discharge side heat exchanger
R refrigerant circuit

The invention claimed is:

1. A vehicle air conditioner comprising:
a compressor which compresses a refrigerant;
a radiator which lets the refrigerant radiate heat to heat air to be supplied into a vehicle interior;
an outdoor heat exchanger disposed outside the vehicle interior to let the refrigerant absorb heat;
an expansion valve which decompresses the refrigerant flowing into the outdoor heat exchanger; and
control means,
the control means being configured to let the refrigerant discharged from the compressor radiate heat in the radiator, decompress the refrigerant by which heat has been radiated by the expansion valve and then absorb heat in the outdoor heat exchanger, thereby heating the vehicle interior,
wherein the control means controls a subcool degree of the refrigerant in the radiator by the expansion valve, and controls a revolution number of the compressor on the basis of a high pressure, and
has a high pressure priority mode to increase a target radiator subcool degree of the radiator in a direction in which the high pressure is set to a predetermined high value, and
a revolution number priority mode to decrease the target radiator subcool degree of the radiator in a direction in which the revolution number of the compressor is set to a predetermined high value.

2. The vehicle air conditioner according to claim 1, wherein the control means switches and executes the high pressure priority mode and the revolution number priority mode, thereby changing the target radiator subcool degree of the radiator to highly maintain the revolution number of the compressor while maintaining the high pressure at the predetermined high value.

3. The vehicle air conditioner according to claim 2, wherein the control means executes the high pressure priority mode to increase the target radiator subcool degree of the radiator in the direction in which the high pressure is set to the predetermined high value, shifts to the revolution number priority mode in a case where the high pressure reaches the predetermined high value, and decreases the target radiator subcool degree of the radiator in the direction in which the revolution number of the compressor is set to the predetermined high value.

4. The vehicle air conditioner according to claim 1, wherein in the high pressure priority mode, the control means increases the target radiator subcool degree of the radiator in a direction in which the high pressure is set to an upper limit value of controlling, and in the revolution number priority mode, the control means decreases the target radiator subcool degree of the radiator in a direction in which the revolution number of the compressor is set to an upper limit value of controlling.

5. The vehicle air conditioner according to claim 4, wherein in the high pressure priority mode, the control means performs feedback correction of the target radiator subcool degree of the radiator on the basis of a deviation between the upper limit value of controlling of the high pressure and an actual high pressure, and in the revolution number priority mode, the control means performs the feedback correction of the target radiator subcool degree of the radiator on the basis of a deviation between the upper limit value of controlling of the revolution number of the compressor and an actual revolution number.

6. The vehicle air conditioner according to claim 1, wherein the control means has efficiency priority control and capability priority control,
in the efficiency priority control, the control means determines the target radiator subcool degree of the radiator on the basis of a volume of air to be passed through the radiator, and
shifts to the capability priority control in a case where conditions that a heating capability by the radiator runs short are established, and in the capability priority control, the control means executes the high pressure priority mode and the revolution number priority mode and corrects the target radiator subcool degree of the radiator.

7. The vehicle air conditioner according to claim 6, which comprises an injection circuit which distributes a part of the refrigerant flowing out from the radiator to return the part of the refrigerant to the compressor,
wherein the control means changes conditions to shift to the capability priority control in a case where the injection circuit returns the part of the refrigerant flowing out from the radiator to the compressor and a case where the injection circuit does not return the part of the refrigerant to the compressor.

8. The vehicle air conditioner according to claim 2, wherein in the high pressure priority mode, the control means increases the target radiator subcool degree of the radiator in a direction in which the high pressure is set to an upper limit value of controlling, and in the revolution number priority mode, the control means decreases the target radiator subcool degree of the radiator in a direction in which the revolution number of the compressor is set to an upper limit value of controlling.

9. The vehicle air conditioner according to claim 3, wherein in the high pressure priority mode, the control means increases the target radiator subcool degree of the radiator in a direction in which the high pressure is set to an upper limit value of controlling, and in the revolution number priority mode, the control means decreases the target radiator subcool degree of the radiator in a direction in which the revolution number of the compressor is set to an upper limit value of controlling.

10. The vehicle air conditioner according to claim 2, wherein the control means has efficiency priority control and capability priority control,
in the efficiency priority control, the control means determines the target radiator subcool degree of the radiator on the basis of a volume of air to be passed through the radiator, and
shifts to the capability priority control in a case where conditions that a heating capability by the radiator runs short are established, and in the capability priority control, the control means executes the high pressure priority mode and the revolution number priority mode and corrects the target radiator subcool degree of the radiator.

11. The vehicle air conditioner according to claim 3, wherein the control means has efficiency priority control and capability priority control, in the efficiency priority control, the control means determines the target radiator subcool degree of the radiator on the basis of a volume of air to be passed through the radiator, and shifts to the capability priority control in a case where conditions that a heating capability by the radiator runs short are established, and in the capability priority control, the control means executes the high pressure priority mode and the revolution number priority mode and corrects the target radiator subcool degree of the radiator.

12. The vehicle air conditioner according to claim 4,
wherein the control means has efficiency priority control and capability priority control, in the efficiency priority control, the control means determines the target radiator subcool degree of the radiator on the basis of a volume of air to be passed through the radiator, and shifts to the capability priority control in a case where conditions that a heating capability by the radiator runs short are established, and in the capability priority control, the control means executes the high pressure priority mode and the revolution number priority mode and corrects the target radiator subcool degree of the radiator.

13. The vehicle air conditioner according to claim 5,
wherein the control means has efficiency priority control and capability priority control, in the efficiency priority control, the control means determines the target radiator subcool degree of the radiator on the basis of a volume of air to be passed through the radiator, and shifts to the capability priority control in a case where conditions that a heating capability by the radiator runs short are established, and in the capability priority control, the control means executes the high pressure priority mode and the revolution number priority mode and corrects the target radiator subcool degree of the radiator.

\* \* \* \* \*